US00RE40620E

(19) United States
(12) Reissued Patent
Elder et al.

(10) Patent Number: US RE40,620 E
(45) Date of Reissued Patent: Jan. 6, 2009

(54) FULLY INTEGRATED ALL-CMOS AM TRANSMITTER WITH AUTOMATIC ANTENNA TUNING

(75) Inventors: Joseph S. Elder, Windermere, FL (US); Mohammed D. Islam, Orlando, FL (US); Joseph T. Yestrebsky, Apopka, FL (US)

(73) Assignee: Micrel, Inc., San Jose, CA (US)

(21) Appl. No.: 11/134,468

(22) Filed: May 23, 2005

Related U.S. Patent Documents

Reissue of:
(64) Patent No.: 6,658,239
Issued: Dec. 2, 2003
Appl. No.: 09/837,775
Filed: Apr. 17, 2001

U.S. Applications:
(63) Continuation-in-part of application No. 09/074,997, filed on May 8, 1998, now Pat. No. 6,253,068.
(60) Provisional application No. 60/046,128, filed on May 9, 1997.

(51) Int. Cl.
*H04B 1/04* (2006.01)
*H04B 1/18* (2006.01)

(52) U.S. Cl. ..... 455/121; 455/126; 455/125; 455/197.2; 455/193.1; 455/129; 455/91

(58) Field of Classification Search ..... 455/120–121, 455/125–126, 123–124, 258–259, 260–265, 455/107, 129, 115.1, 67.11, 77, 575.7, 192.3, 455/193.1, 193.3, 194.2, 195.1, 196.1, 197.2, 455/197.3; 333/17.3, 124; 343/860, 861; 330/126, 192, 302, 309
See application file for complete search history.

(56) References Cited

U.S. PATENT DOCUMENTS 3,882,424 A * 5/1975 Debois et al. ..... 331/23
4,027,242 A * 5/1977 Yamanaka ..... 455/183.1
4,308,508 A * 12/1981 Sommer et al. ..... 331/23
4,587,497 A * 5/1986 Keller et al. ..... 331/116 R
4,947,407 A * 8/1990 Silvian ..... 329/347
5,050,194 A * 9/1991 Pickering et al. ..... 327/17
5,136,719 A 8/1992 Gaskill et al.
5,152,005 A * 9/1992 Bickley ..... 331/2
5,373,257 A * 12/1994 Shimoda ..... 331/17
5,408,202 A * 4/1995 Shirazi et al. ..... 331/17

(Continued)

OTHER PUBLICATIONS

M. Biehl, A Fully–Integrated 900 Mhz Spread–Sprectum Transmitter, Aug. 6, 1993, THAM P4.5, pp. 308–309.*
Abidi, Asad A., "CMOS—only RF and Baseband Circuits for a Monolithic, 900 MHz Wireless Transceiver," Bipolar Circuits & Tech. Mtg., Minneapolis, Oct. 1996, pp. 35–42.*
Abidi, Asad A., "Radio–Frequency Integrated Circuits for Portable Communications," *Custom IC Conference*, San Diego, CA, May 1994, pp. 151–158.*
Chiang, P.J., Rofougaran, A., and Abidi, A. A., "A CMOS Channel–Select Filter for a Direct Conversion Wireless Receiver," *Symp. On VLSI Circuits*, Honolulu, pp. 62–63, 1996.*
Chang, J., Abidi, A. A., and Viswanathan, C.R., "Flicker Noise in CMOS Transistors from Subthreshold to Strong Inversion at Various temperatures," *IEEE Trans. On Electron Devices*, vol. 41, No. 11, pp. 1965–1971, 1994.*

(Continued)

*Primary Examiner*—Pablo N. Tran
(74) *Attorney, Agent, or Firm*—Patent Law Group LLP; Brian D. Ogonowsky

(57) ABSTRACT

A monolithic AM transmitter is disclosed. An external antenna forms part of a resonance network so that the antenna resonance point is automatically tuned to the transmit frequency. This provides flexibility with no added cost to the transmitter. Additionally, components of the transmitter can be formed on a single monolithic integrated circuit.

52 Claims, 30 Drawing Sheets

U.S. PATENT DOCUMENTS

| | | | | | |
|---|---|---|---|---|---|
| 5,483,688 | A | | 1/1996 | English et al. | |
| 5,495,512 | A | * | 2/1996 | Kovacs et al. | 331/17 |
| 5,534,845 | A | * | 7/1996 | Issa et al. | 180/167 |
| 5,612,648 | A | * | 3/1997 | McClellan et al. | 327/563 |
| 5,689,814 | A | * | 11/1997 | Hagisawa et al. | 455/226.2 |
| 5,789,987 | A | * | 8/1998 | Mittel et al. | 329/318 |
| 5,802,463 | A | * | 9/1998 | Zuckerman | 455/208 |
| 5,850,595 | A | * | 12/1998 | Rieger et al. | 455/317 |
| 6,061,550 | A | * | 5/2000 | Tanaka et al. | 455/121 |
| 6,167,246 | A | * | 12/2000 | Elder et al. | 455/313 |
| 6,278,866 | B1 | * | 8/2001 | Elder et al. | 455/192.1 |
| 6,324,390 | B1 | * | 11/2001 | Elder et al. | 455/333 |
| 6,377,788 | B1 | * | 4/2002 | Elder et al. | 455/266 |
| 6,978,126 | B1 | * | 12/2005 | Blaker et al. | 455/352 |
| 7,058,372 | B1 | * | 6/2006 | Pardoen et al. | 455/125 |
| 7,202,734 | B1 | * | 4/2007 | Raab | 330/126 |
| 2005/0003771 | A1 | * | 1/2005 | De Ruijter et al. | 455/127.1 |

OTHER PUBLICATIONS

Khorram, S. et al., "A CMOS Limiting Amplifier & Logarithmic Signal–Strength Indicator," Integrated Circuits & Systems Laboratory, Electrical Engineering Department, University of California, Los Angeles (19 pages).*

Rofougaran, A., et al., "A 900 MHz CMOS Frequency–Hopped Spread Spectrum RF Transmitter IC", *Custom Integrated Circuits Conf.*, San Diego, CA, May 1996, pp. 209–212.*

Rofougaran, A. et al., "A 900 MHz CMOS Frequency–Hopped Spread Spectrum RF Transmitter IC," Integrated Circuits & Systems Laboratory, Electrical Engineering Department, University of California, Los Angeles (20 pages).*

Rofougaran, A., Chang, J. Y.—C., Roufougaran, M., Khorram, S., and Abidi, A A., "A 1 GHz CMOS RF Front–End IC with Wide Dynamic Range," presented at *European at European Solid–State Circuits Conf.*, Lille, France, pp. 250–253, 1995.*

Rofougaran, A., Chang, J. Y.—C., Rogougaran, M., Khorram, S., and Abidi, A. A., "A 1 GHz CMOS RF Front–End IC with Wide Dynamic Range," (23 pages).*

Rofougaran, A., et al., "A 900 MHz CMOS LC—Oscillator with Quadrature Outputs," presented at the 1996 Int'l. Solid–State Circuits Conference, 10 pages.*

Rudell, Jacques C., University of California, Berkeley, "CMOS VLSI Frequency Translation for Multi–Standard Wireless Communication Transceivers," Qualifying Examination, Apr. 8, 1996, pp. 1–24.*

Chang, Glenn et al., "An Agile, Low–Power CMOS Digitally Synthesized 0–13 MHz Sinewave Generator," Integrated Circuits & Systems Laboratory, Electrical Engineering Department, University of California, Los Angeles, (14 pages).*

* cited by examiner

CONNECTION PIN DIAGRAM FOR THE INVENTION
FULLY INTEGRATED, ALL CMOS ASK/AM TRANSMITTER WITH AUTOMATIC ANTENNA TUNING

PL
IBUTR
ICLAMP
IP5U
IR5UA
IR5UB
VDDSYN
VDD
SHUT
PLLREF
VCML
VSSSYN
VSS
VDDF
VCC
VCOA
VCOAB
IBSA
IBSB
VCOB
VCOBB
I
Q
PLL_NEW
71
BB
VDOB
OUTP
OUTM
VCMH
IBIAS
PDBUF
14
AC
ANTP
ANTM
BLANKPA
IBPA
ICPA
GATEP
GATEN
P5V
ENDCAL
CALEND
ASKIN
ASK
IT5U
IBTUNE
IPSUB
IBPOLY
70
ACL
RC
PLLREF
CALCK
ENDCAL
TUNEREF
CKIN
POR
REFCLK
RO
IP4U
I4P0U
CRIN
CLK
CK
REFOSC
1
STDB
XU1
XU2
SCMT
INV

| FIG. 5c-1 | FIG. 5c-2 | FIG. 5c-3 |
|---|---|---|

CKD
CKD0
XU1
A
B
XAND2
XU2
INV
ACLUP
ASK
XU3
INV
SPACE
XU4
INV
MARK
OFFPA
XU6
INV
OFFPAB
64
PK1
VDD
VDD
VREF
MARK
MARK
ANTP
ANTM
IBPKD
ITUNE
IBP
IBIAS
SHUT
VSS
VSS
PKOUT
VCMOUT
PKD
60
GF1
VDD
VDD
VTUNE
VTUNE
VCAB
VCAB
TESTPAD
PKOUT
VINM
VCMOUT
VINP
TESTPAD
VSS
ACLUP
VDD
VSS
VOUT
GMFOR
BUILD AS TWO SEGENTS
XC1
CPOLY
10pf
VSS
VSS
VDD
VDD
XM27
PMOS
5U
2U
M=1
XM27A
PMOS
5U
0.5U
M=1

PS
VDD
MARK
SPACE
IBSL
(IRPOLY)
1uA for 20KBPS
VSS
VDD
MARK
SPACE
IBIAS
VSS
GATEP
GATEN
GATEP
GATEN
PASLEW
70
CL
VDD
VSS
BLANKPA
IG20
IB20A
VDD
VSS
BLANKPA
IS26
IS2CA
VACL
IBPA
ICPA
IBPA
ICPA
PACL
VDD
XM12
PMOS
5U
2U
M=4
XM13
PMOS
5U
2U
M=1
XM14
PMOS
5U
2U
M=2
XM15
PMOS
5U
2U
M=2
XM16
PMOS
5U
2U
M=1
IFXA
XM19
PMOS
5U
0.5U
M=4
XM20
PMOS
5U
0.5U
M=1
XM21
PMOS
5U
0.5U
M=2
XM22
PMOS
5U
0.5U
M=2
XM23
PMOS
5U
0.5U
M=1
XU10
XGATE
OFFPA
OFFPA

| | |
|---|---|
| FIG. 5d-1 | FIG. 5d-2 | FIG. 5d-3 |
| FIG. 5d-4 | FIG. 5d-5 | FIG. 5d-6 |

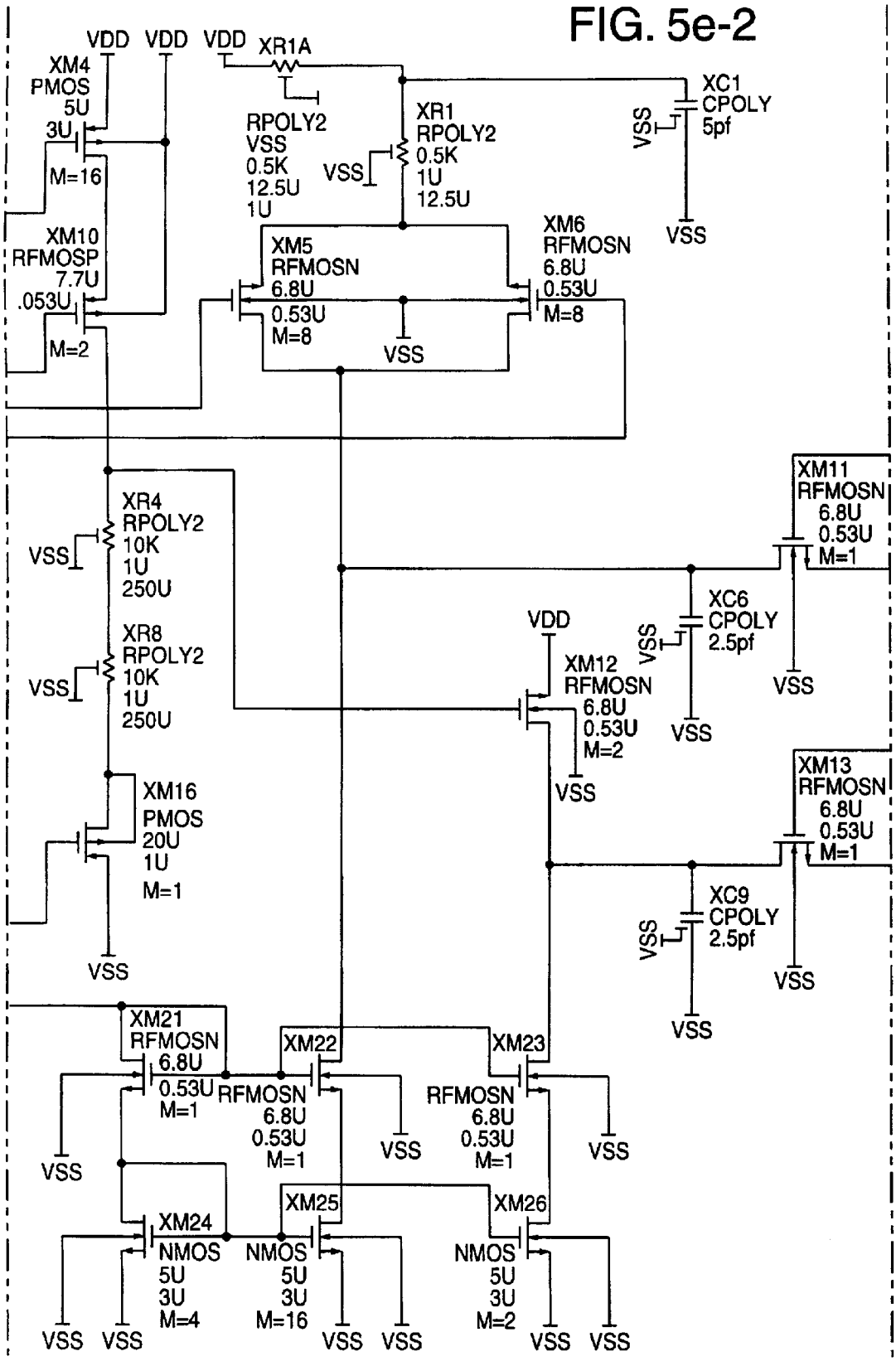
FIG. 5e-2
VDD
VDD
VDD
XR1A
XM4
PMOS
5U
3U
M=16
RPOLY2
VSS
0.5K
12.5U
1U
XR1
RPOLY2
0.5K
1U
12.5U
VSS
XC1
CPOLY
5pf
VSS
VSS
XM10
RFMOSP
7.7U
.053U
M=2
XM5
RFMOSN
6.8U
0.53U
M=8
VSS
XM6
RFMOSN
6.8U
0.53U
M=8
XR4
RPOLY2
10K
1U
250U
VSS
XR8
RPOLY2
10K
1U
250U
VSS
XM16
PMOS
20U
1U
M=1
VSS
XM11
RFMOSN
6.8U
0.53U
M=1
XC6
CPOLY
2.5pf
VSS
VSS
VDD
XM12
RFMOSN
6.8U
0.53U
M=2
VSS
VSS
XM13
RFMOSN
6.8U
0.53U
M=1
XC9
CPOLY
2.5pf
VSS
VSS
VSS
XM21
RFMOSN
6.8U
0.53U
M=1
VSS
XM22
RFMOSN
6.8U
0.53U
M=1
VSS
XM23
RFMOSN
6.8U
0.53U
M=1
VSS
XM24
NMOS
5U
3U
M=4
VSS
VSS
XM25
NMOS
5U
3U
M=16
VSS
VSS
XM26
NMOS
5U
3U
M=2
VSS
VSS

| FIG. 5e-1 | FIG. 5e-2 | FIG. 5e-3 |
|---|---|---|

| FIG. 5g-1 |
| --- |
| FIG. 5g-2 |

| FIG. 5i-1 | FIG. 5i-2 | FIG. 5i-3 |
|---|---|---|

XU43
INV
XU48
MUX2I
XU44
INV
Q
AD
SO1
E2N
AFN
XU52
DFCCR
D
Q
C
CR
CE
RS
D0
XU56
INV
XU53
DFCCR
OCLK
VDD
RESETB
XU61
NOR3
XU71
INV
XU82
NAND4
A
B
C
D
XU72
NOR2
NAND4
XU73
XU74
NOR3
XU75
INV
DIR
XU77
MUX2I
XU76
INV
XU78
DFCCR
D4
XU79
INV
XU84
INV
V+
VDD
VSS
V-

| FIG. 5j-1 | FIG. 5j-2 | FIG. 5j-3 |
|---|---|---|

FULLY INTEGRATED ALL-CMOS AM TRANSMITTER WITH AUTOMATIC ANTENNA TUNING

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of application Ser. No. 09/074,997, filed on May 8, 1998, issued as U.S. Pat. No. 6,253,068, entitled "Fully Integrated All-CMOS AM Transmitter with Automatic Antenna Tuning," which is based on the provisional application Ser. No. 60/046,128, filed May 9, 1997, entitled "Fully Integrated All-CMOS AM Transmitter With Automatic Antenna Tuning", by J. Scott Elder, Joseph T. Yestrebsky, and Mohammed D. Islam.

BACKGROUND

FIELD OF THE INVENTION

This invention relates to transmitters and, in particular, to an integrated transmitter with automatic antenna tuning.

BRIEF DESCRIPTION OF THE DRAWINGS

FIG. 1b identifies pins of an integrated circuit incorporating the transmitter shown in FIG. 1a.

FIG. 2b identifies pins of an integrated circuit incorporating the transmitter shown in FIG. 2a.

In the figures, elements having similar functionality are identically labeled.

DETAILED DESCRIPTION

Figure 1A:
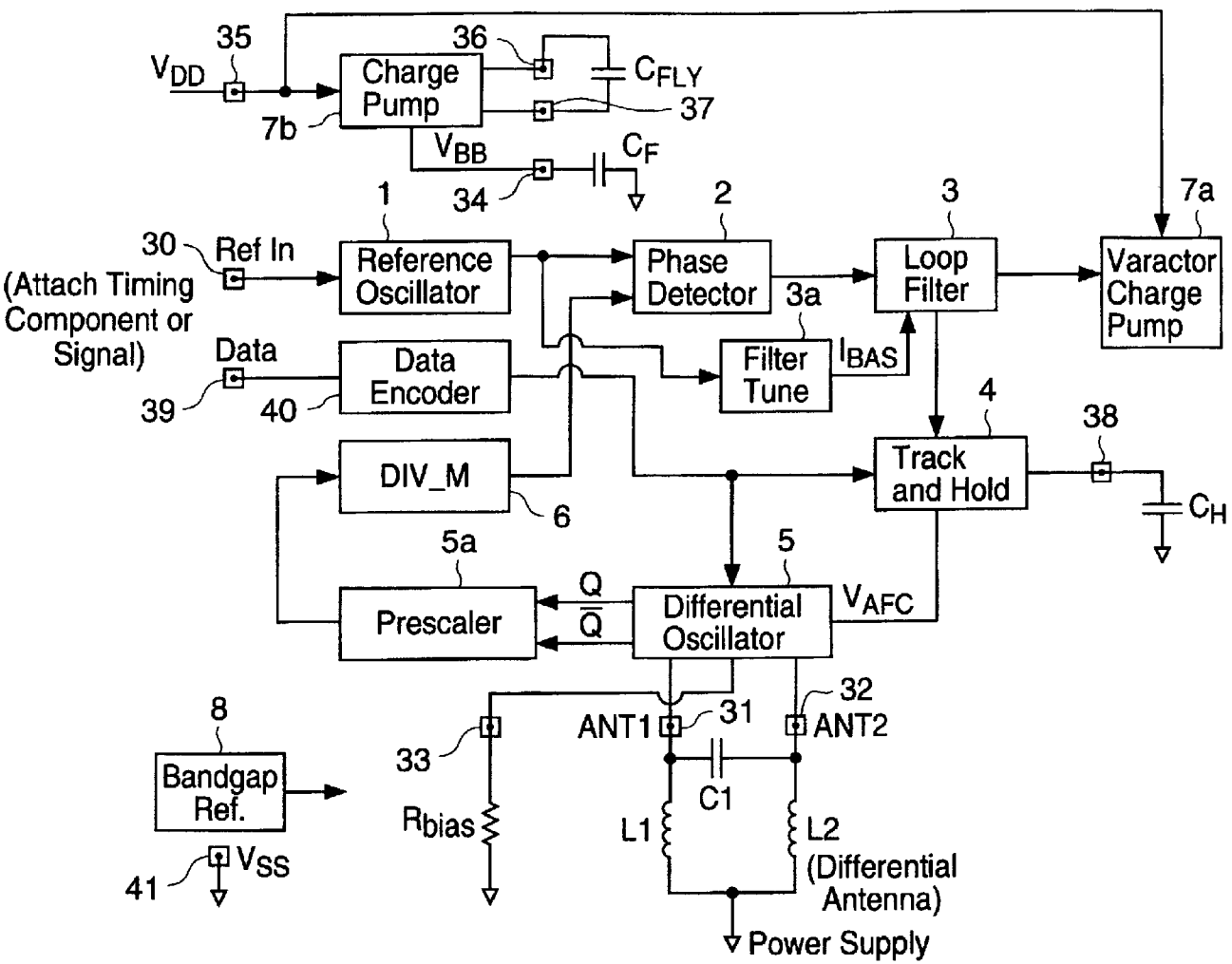
FIG. 1a is a block diagram illustrating the functional units in a transmitter in accordance with one embodiment of the invention.
Figure 1B:
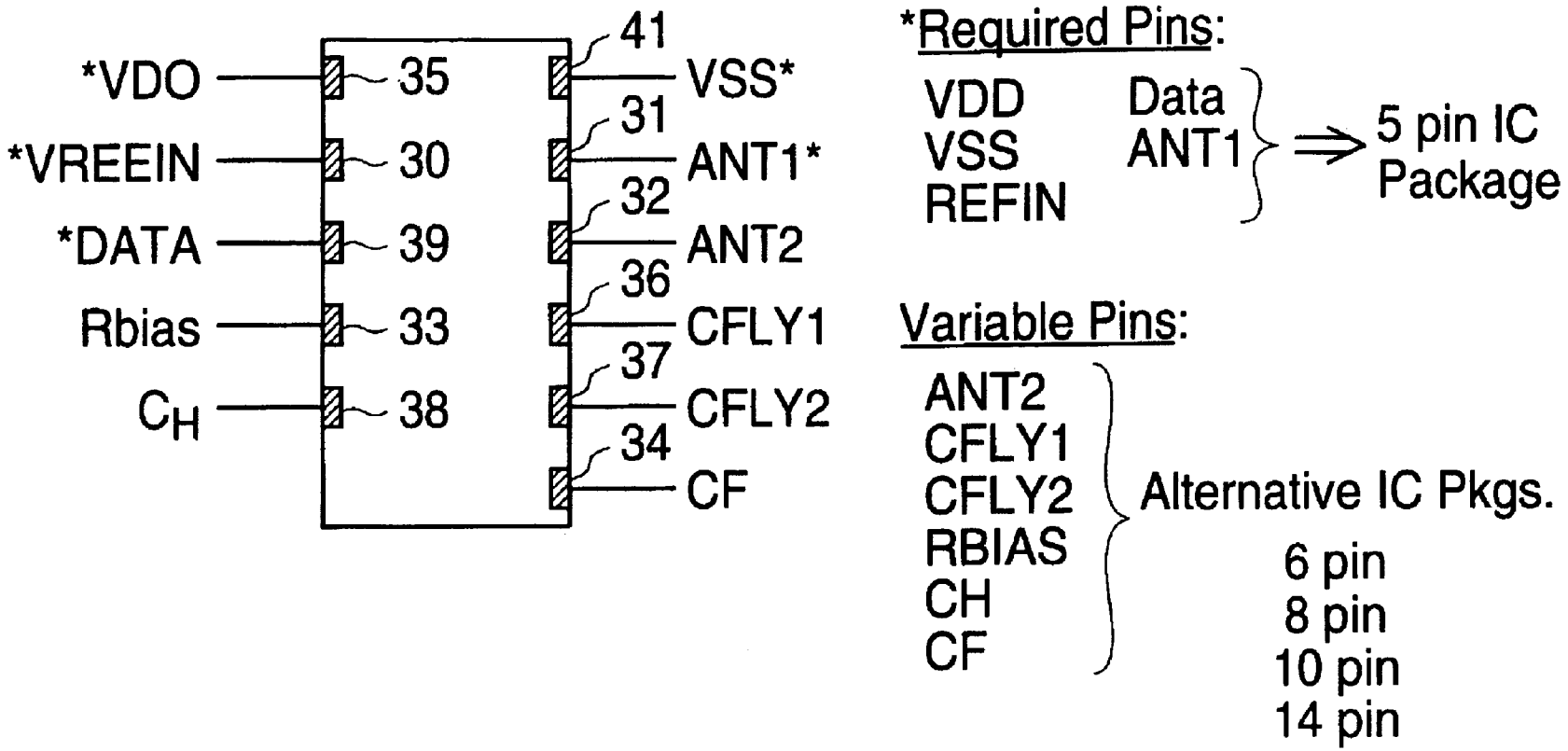

The Embodiments of FIGS. 1a and 1b

FIG. 1a illustrates the basic structure and elements of one embodiment of a transmitter according to the present invention. The elements can be constructed on a single semiconductor Chip using Complementary Metal Oxide Semiconductor (CMOS) technology. Other bipolar type elements, for example diodes and transistors, can also be constructed in CMOS technology, where appropriate. The block diagram shown in FIG. 1a includes the following elements, with associated reference numbers:

| Functional Element | Reference No. |
|---|---|
| a. Reference Oscillator | 1 |
| b. Phase Detector | 2 |
| c. Loop Filter | 3 |
| d. Filter Tune | 3a |
| e. Track and Hold | 4 |
| f. Differential Oscillator | 5 |
| g. Prescaler | 5a |
| h. Div_M | 6 |
| i. Varactor Charge Pump | 7a |
| j. Charge Pump | 7b |
| k. Bandgap Reference | 8 |

In the embodiment of FIG. 1a, the elements of the transmitter are fully integrated, i.e., all of these functions are, in their entirety, simultaneously incorporated onto a single semiconductor die (integrated circuit or IC). Aside from power supply decoupling capacitors, no external components are included for operating the transmitter except an antenna (L1, L2), and antenna resonating capacitor (C1). Additional aspects of the invention (to be detailed subsequently) reduce overall transmitter system complexity and cost, while improving transmitter performance.

Special Charge Pump circuitry 7b can be included within the embodiment to allow for applications which use a wide range of supply voltages. This makes the embodiment shown in FIG. 1a quite general in nature, and lowers overall radio system costs. In most embodiments of charge pump 7b, nFETs are cascaded to guarantee that nFET drain-to-source voltage is clamped to acceptable levels, thus protecting the nFET devices from hot-electron effects in applications with large external supply voltages.

Reference Oscillator 1 generates a precise timing waveform based on a timing element or timing signal applied externally at the reference input pad 30 of the embodiment shown in FIG. 1a.

Phase Detector 2, Loop Filter 3, Filter Tune 3a, Differential Oscillator 5, Prescaler 5a and divide-by M circuit 6 collectively form a phase-locked loop (PLL) where the frequency of Differential Oscillator 5 is locked to that of Reference Oscillator 1.

Filter Tune 3a can itself be a phase-locked loop tuned to the Reference Oscillator 1. Filter Tune 3a generates a bias current $I_{bias}$ for Loop Filter 3. This approach stabilizes the performance characteristics of Loop Filter 3 against semiconductor process variation during chip production and temperature variations during operation of the chip.

Differential Oscillator 5 serves as the source of the transmit frequency. It is important to note that oscillator 5 is within the phase-locked loop of phase detector 2, loop filter 3, prescaler 5a, and divide-by M circuit 6 and includes a voltage controlled oscillator (VCO). Oscillator tuning can be accomplished by means of a differential structure of diffusion type p-n diodes(varactor diodes) within differential oscillator 5. Some embodiments may alternatively include tuning diodes external to the integrated circuit and connected in a differential manner. Some embodiments may alternatively include a phase detector and up/down converter coupled to an array of tuning capacitors.

Differential oscillator 5 provides a differential output into a (differential) antenna L1, L2. The antenna formed by L1 and L2 is coarsely tuned by capacitor C1, and fine tuned to the frequency of Reference oscillator 1 via the tuning structure of differential oscillator 5, L1, L2, and C1 can be externally applied to the integrated circuit shown in FIG. 1a at pads 31 and 32. For less demanding applications, where harmonic distortion is less important, differential oscillator 5 need not be differential in nature and only a single-ended oscillator can be utilized, which reduces IC pin count.

Addition of external resistor $R_{bias}$ coupled to pad 33 in FIG. 1a sets a bias current in differential oscillator 5, which in turn sets the transmit power level. For fixed transmit power applications, this bias may be fixed on the integrated circuit itself, eliminating the need for pad 33.

In the embodiment shown in FIG. 1a, the output signal from differential oscillator 5 is frequency divided by prescaller 5a and divide-by M circuit 6. Prescaller 5a and divide-by-M circuit 6 output a signal with frequency near that of reference oscillator 1, within the locking and tracking range of the phase-locked loop that includes differential oscillator 5.

In some embodiments, a charge pump 7b provides voltage multiplication, which allows the integrated circuit to operate with supply voltages below 3V. An externally applied pumping capacitor $C_{FLY}$ is supplied across pads 36 and 37. This supply voltage generation technique can either be open loop controlled or closed loop controlled. In a closed loop application, the operation of charge pump 7b ceases when the external supply voltage is sufficient for proper operation of the transmitter. In an open loop application, the voltage settles to an integer multiple of the input voltage source. The embodiment of FIG. 1a is capable of operating with an external supply voltage VDD to pads 35 that can be greater than about 12V. The operating voltage VBB of the integrated chips is supplied at pad 34.

Track and hold circuit 4 holds the output voltage of loop filter 3 constant during transmit 'spaces', when differential oscillator 5 is disabled. This function requires an externally applied hold capacitor $C_H$ on pad 38. An alternative embodiment includes a hold capacitance $C_H$ integrated on the IC Chip (e.g., a DAC approach).

The operation of track and hold circuit 4 and differential oscillator 5 is controlled by the data input signal at pad 39. During "space" signals, differential oscillator 5 is off (i.e., not transmitting) and track and hold 4 holds the output voltage of loop filter 3 constant. During "mark" signals, track and hold 4 outputs the signal from loop filter 3 and differential oscillator 5 is on (i.e., transmitting). Some embodiments include a data encoder circuit 40 that inputs a data signal from pad 39 and encodes it for transmission. Transmission is accomplished by controlling the output power of differential oscillator 5. The output signal to antenna L1, L2 can be modified for any data transmission scheme.

A bandgap reference circuit 8 provides temperature and supply voltage compensated bias voltages and currents for critical nodes within the invention.

The embodiment of FIG. 1a allows for packaging in a 10 pin package. Embodiments can also have a fewer or greater number of pins. For example, in applications where charge pump 7b is not required (i.e. adequate supply voltage exists for proper device operation), embodiments with fewer pins are possible.

Numerous physical embodiments of the invention exist, depending on the intended applications and system requirements. An embodiment of an integrated circuit is illustrated in FIG. 2b, along with those signals which are required for the embodiment shown in FIG. 1a. Some signals which depend on the application, system requirements, and level of integration are also shown. One need not, for example, integrate charge pump 7b onto the integrated circuit. Charge pump 7b can be provided external to the IC chip shown in FIG. 1b. Removal of charge pump 7b from the integrated circuit may be more desirable than the more highly integrated transmitter in some applications.

Having said this, FIG. 1b illustrates an embodiment of the invention having a 5-pin IC package. The 5-pin IC package includes pads 35(VDD), 30 (VREFIN), 41 (VSS), 31 (ANTI) and data (39). Placing further functions (e.g. an integrated circuit with charge pump 7b or data encoder 40) on the IC package may result in additional pins. A particular embodiment of the invention can include any number of pins greater than 5. Additionally, particular embodiments of the invention can be packaged in any fashion. Packaging technologies are well known to one skilled in the art. Additionally, implementation of embodiments of the invention to CMOS technologies (i.e., forming particular elements on semiconductor chips) is well known in the art.

The embodiments of the invention shown in FIG. 1a converts an input (logic level) data sequence on pin 39 into an amplitude modulated (AM) or frequency modulated (FM) RF carrier. Transmit antenna L1 and L2 (FIG. 1a) forms part of the resonant network of Differential (RF) Oscillator 5. Differential Oscillator 5 is enclosed within a closed-loop control system (a phased-locked loop) at the frequency of reference oscillator 1. The antenna L1 and L2 are combined with variations in differential oscillator 5 to form an LC resonant circuit, which has a resonance point that is automatically tuned to the transmit frequency. The transmit frequency can be an integer multiple of the output frequency of reference oscillator 1.

Two Charge Pumps, pumps 7a and 7b, and appropriate control functions are included in the transmitter of FIG. 1a to (1) provide sufficient bias voltage for varactor diodes, and (2) allow the integrated circuit to function properly for externally applied bias supplies below about 3V.

Reference Oscillator 1

Reference Oscillator 1 develops the precision timing signal which is used by the phase-locked loop to set the transmit frequency. The phase-locked loop includes phase detector 2, loop filter 3, track and hold 4, differential oscillator 5, prescaler 5a, and divide-by-M circuit 6. In most embodiments, Reference Oscillator 1 is of the Colpitts variety, and is connected to a timing device external to the integrated circuit (IC). Typical timing devices include ceramic resonators, crystals, or (tuned) inductor-capacitor tank circuits. Phase lag capacitors generally associated with ceramic resonators are integrated onto the IC to lower cost.

Figure 3A:
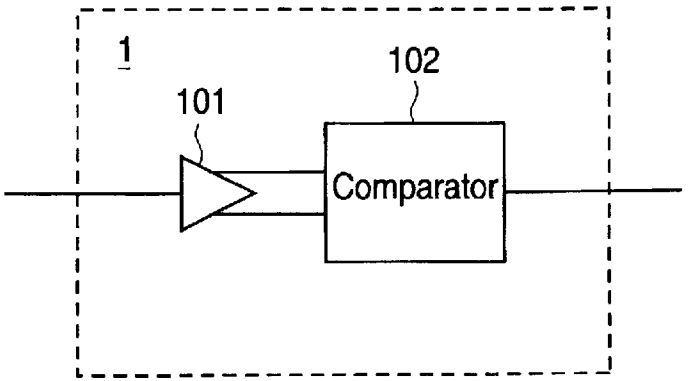
FIG. 3a shows a block diagram of an example of a reference oscillator.

In most embodiments, as shown in FIG. 3a, reference oscillator 1 includes a single-ended amplifier 101 which provides differential outputs. In some embodiments, amplifier 101 provides no dc gain, eliminating any dc offset correction requirements. The amplifier output signal is differentially coupled into a comparator 102 which limits the output signal waveform to logic level swings. The output stage of comparator 102 is ac current balanced to eliminate any unnecessary power supply noise. Reference oscillator 1 requires only a single IC pin for connection of the precision timing element or signal input to amplifier 101.

Finally, reference oscillator 1 supports the application of an external (precision) timing signal rather than a timing element. The timing signal is applied at the same terminal as would receive an external timing element signal.

Phase Detector 2

Phase detector 2 provides a measure of the frequency difference between the output signal from Reference oscillator 1 and the output signal from differential oscillator 5, frequency divided by scale factor M within Div_M circuit 6 and prescaled in prescaler 5a. Phase detector 2 needs only to discriminate frequency differences because phase error in the phase-locked loop (PLL) does not affect performance of the transmitter.

In most embodiments, phase detector 2 is a digital phase-frequency detector. Digital phase-frequency detectors are advantageous for at least two reasons: Firstly, the circuit output signal is differential in nature; secondly, when the phase-locked loop finally acquires frequency and phase lock, phase-frequency detector 2 outputs a series of very narrow pulses in the time domain, which is much easier to filter with an integrated loop filter than a phase detector that exhibits quadrature phase lock.

Loop Filter 3 and Filter Tune 3a

The output waveform of phase detector 2 contains both a dc and an ac term; the dc term represents the frequency error between the output signal of reference oscillator 1 and the output signal of differential oscillator 5 prescaled and divided by scale factor M. Only the dc term is of value; the ac term is removed by loop filter 3.

In many embodiments, loop filter 3 is a gm-c type filter, a gm-c type filter is advantageous for at least three reasons. Firstly, the variance in gm-c loop characteristics is almost completely related to the gm variances since integrated capacitors are well behaved. Secondly, a fairly high order filter may be constructed using only modest amounts of integrated capacitance, which reduces the cost of producing the integrated circuit chip. Thirdly, such filters are easily 'tuned' to stabilize their characteristics against semiconductor process and temperature variations. Such tuning is provided from a tuning phase-locked loop, filter tune 3a, 'slaved' from reference oscillator 1.

Figure 3B:
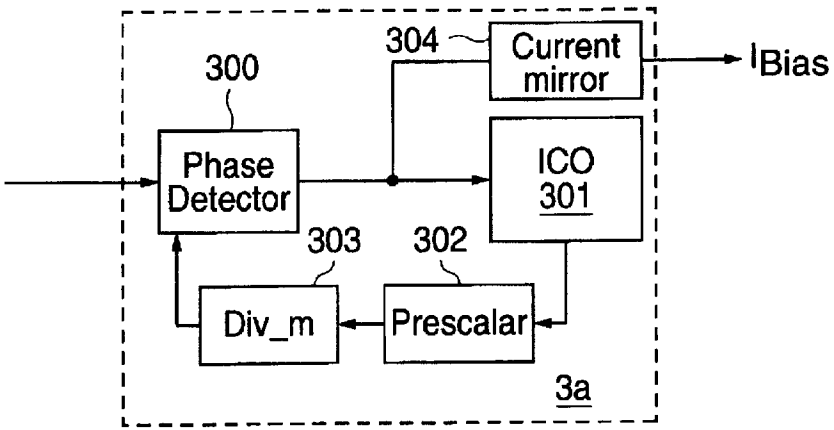
FIG. 3b shows a block diagram of an example Filter Tune circuit.

An embodiment of filter 3a is shown in FIG. 3b. Filter Tune 3a is itself a phase-locked loop, referenced to the frequency of the output signal from reference oscillator 1. The phased-locked loop of filter tune 3a may include a phase detector 300, current controlled oscillator 301, prescaler 302, and divided-by M circuit 303. The phase-locked loop of filter tune 3a adjusts the bias current of the current-controlled oscillator of filter tune 3a to force the current-controlled oscillator frequency to equal the frequency of the output signal from reference oscillator 1. This may be accomplished directly or indirectly through the use of frequency prescalers 302 or frequency dividers 303. The resultant bias current is mirrored in current mirror 304 to provide the bias current for loop filter 3.

Track and Hold 4

During transmission of 'spaces', differential oscillator 5 may be disabled. This 'breaks' the phase-locked loop that includes phase detector 2 and differential oscillator 5. Track and hold 4 is used to hold the state of the phase-locked loop to that just prior to disabling differential oscillator 5, signifying a 'space' transmission. This is desirable for at least two reasons: (1) so that the phase-locked loop does not have to require frequency lock for each 'mark' transmission; and (2) to assure that differential oscillator 5 is not 'chipped' or swept in frequency as the Phase-locked loop settles out during a 'mark'0 transmission.

The data signal input to track and hold 4, which is the output signal from data encoder 40, controls track vs. hold operation. During 'space' transmissions, track and hold 4 is placed in the hold mode.

Some applications may be better served (e.g., be of lower cost for the transmitters) by the use of an external hold capacitor ($C_H$) for track and hold 4, as shown in FIG. 1a. However, the effective hold capacitance can be integrated onto the IC chip, with additional cost, and perhaps a modest compromise in the 'droop' of the hold voltage. For example, to support very low data rates, an external hold capacitor into the integrated circuit is preferred, but as the operational data rate increases, the impact of integrating this capacitor into the integrated circuit is less deleterious to cost and performance. So, an alternative embodiment is the integration of $C_H$, which reduces the IC pin count of the resulting integrated circuit by one.

Differential Oscillator 5

Differential oscillator 5 includes a voltage controlled oscillator (VCO). The voltage controlled oscillator can be based on two cross-coupled Field Effect Transistors (FET's) where antenna L1 and L2 serves as the load impedance for the FET's. The cross-coupled FET structure provides the feedback for oscillatory behavior. In the embodiment shown in FIG. 1a, the antenna is applied externally to the integrated circuit, differentially coupled to the external bias supply. In FIG. 1a, antenna L1, L2 is coupled to pads 31 and 32, respectively. The differential antenna is shown in FIG. 1a as components L1 and L2. The antenna is brought coarsely in the range of the proper transmit frequency by coupling an external capacitor C1 across the external (differential) antenna, as is illustrated in FIG. 1a. This sets the nominal frequency of oscillation for differential oscillator 5. This coarse capacitor can also be integrated onto the integrated circuit, further reducing external component requirements. By integrating the coarse capacitance on the integrated circuit chip, the antenna design requirements are further restricted so that a resonant frequency of the antenna and capacitor circuit is near to the operating frequency of differential oscillator The differential oscillator frequency is adjustable via a dc control signal VAFC, which is the filtered output signal from phase detector 2. Two reverse-biased p-n diffused-junctions (varactors) are connected differentially across the cross-coupled FET's of differential circuit 5. As the dc level of VAFC varies, the capacitance of the reverse-biased p-n junctions varies inversely. This capacitance forms part of the resonant tank circuit which sets the frequency of oscillation. Thus, a differential varactor diode approach can be the method used to modify the resonant point of antenna L1, L2. An alternative varactor approach is to use the CV characteristics available in an MOS diode.

A bias current for differential oscillator 5 is set via addition of resistor Rbias, shown externally to the embodiment of FIG. 1a. A closed-loop voltage follower regulates a voltage based on the internal bandgap reference 8 on the integrated circuit. Rbias sets the bias current based on the regulated voltage; this current is mirrored to differential oscillator 5 as the bias current.

An alternative to providing $R_{bias}$ externally is to integrate this onto the chip as a fixed, unmodifiable current. This will result in a fixed, unmodifiable transmit power level. If the on-chip $R_{bias}$ resistor is replaced by a digital to analog converter, the transmit power level can be varied by communicating to the integrated circuit (via separate input pins) a data pattern that sets the desired transmit power level.

Input data is used to electronically steer the bias current to differential oscillator 5. During 'mark' transmissions, the bias current is connected to differential oscillator 5. Differential oscillator 5 then begins to oscillate, transmitting an RF carder during the 'mark' interval. Alternatively, during a 'space', the bias current is disconnected from differential oscillator 5, and so oscillation ceases, transmitting the equivalent of a 'space'.

Special back-to-back trapped drain field effect transistor (FET) structures can be employed at critical high frequency nodes of differential oscillator 5 to minimize capacitance and improve bandwidth. The preferred embodiment is circular drain structures, although other structures (octagonal, hexagonal, etc.) are acceptable. This structure has important ramifications, since the result is a very small parasitic capacitance at the drain node of the FET and a larger capacitance at the source node of the FET. This 'breaking-apart' of the normally equal drain and source parasitic capacitances actually further improves the gain-bandwidth (GBW) of differential oscillator 5 beyond just the improvement anticipated by a lowering of the drain capacitance. Said another way, the extra source capacitance actually improves GBW.

A differential oscillator such as differential oscillator 5 is employed for a good reason, namely that such a structure driving a differential antenna results in reduced harmonic distortion of the transmitted signal. This is important in some critical applications, but is less important in other applications. Thus an alternative embodiment is the use of a non-differential oscillator where application requirements permit. This reduces the cost of the transmitter, as well as its pin count. It is anticipated that a differential scheme will be necessary to meet most international regulatory requirements similar to the United States FCC and Part 15 of the Code of Federal Regulations.

Prescaler 5a

Differential oscillator 5 operates at a very high frequency, beyond the operating range of conventional CMOS logic dividers. This frequency is divided down by a high speed circuit, prescaler 5a, before further division by conventional logic can take place. One embodiment of prescaler 5a is composed of a concentration of high speed cross-coupled FET divide-by-two circuits.

Prescaler 5a is biased using a current which is tuned to reference oscillator 1. This guarantees that the bandwidth of prescaler 5a is temperature and process independent.

Special back-to-back trapped drain field effect transistor (FET) structures can be employed at critical high frequency nodes of prescaler 5a to minimize capacitance and improve bandwidth.

Div-M 6

Once the frequency of the output signal from differential oscillator 5 is prescaled to an appropriate lower frequency, conventional CMOS logic dividers are used to further divide the frequency down to approximately the operating frequency of reference oscillator 1. This is accomplished by division function Div_M 6 (divide by M circuit).

Varactor Charge Pump 7a

The reverse-biased p-n junction capacitors (i.e., varactors) included in differential oscillator 5 require a large bias potential for proper operation. On the other hand, the varactors require very little bias current. The need for extra circuitry to construct the varactor bias voltage depends on the magnitude of the bias supply $V_{DD}$ externally supplied to the chip on pad 35.

For applications where the external bias supply is in the vicinity of 12V, extra bias generation circuitry is not required. However, for lower external bias voltages, a circuit is required to synthesize a larger varactor bias voltage $V_{BB}$ from the smaller external bias voltage $V_{DD}$. This function is preferentially accomplished by a voltage multiplying charge pump 7b, since the load current is very small. Such a circuit in CMOS is easily integrated onto the chip without the need for additional external components. Thus, no additional pins are required to provide this function on the integrated circuit chip.

Charge Pump 7b

Applications for this transmitter chip often demand operation with external bias supply voltages ranging from 12V down to below 3V. However, operation at bias voltages much below about 5V in CMOS is difficult without special processing (to lower FET threshold voltages), and the use of sub-micron or deep-sub-micron technology in chip manufacturing technologies. To meet this requirement using inexpensive technology, a voltage multiplying charge pump 7b is included. Charge pump 7b provides supply voltages of sufficient magnitude (generally greater than approximately 4V) from externally applied voltages lower than this value. The output voltage from charge pump 7b, $V_{BB}$ is then used instead of the external bias voltage $V_{DD}$ to power-up other elements on the integrated circuit chip.

Charge pump 7b is different from varactor charge pump 7a. Firstly, charge pump 7b must supply much larger output currents than varactor charge pump 7a. Secondly, varactor charge pump 7b is required for the transmitter to operate except in applications where the external supply voltage is approximately 12V. Charge pump 7b, however, is only required for applications where the external supply voltage is below about 5V. Also, varactor charge pump 7a requires no external pins on the IC package. Charge pump 7b requires several package pins, (e.g., pads 36 and 37 for a pumping or 'flying' capacitor $C_{fly}$, and pad 34 for a filtering capacitor $C_F$).

Thus, there are several physical embodiments of integrated circuits. It is perhaps most cost effective to include varactor charge pump 7a on any physical embodiment since this costs no package pins and only modest CMOS die area. However the inclusion of charge pump 7b is expensive due both to die area and required package pins, and thus may not be included on embodiments intended for applications with greater than about 5V external supply voltages. One further alternative is not to include charge pump 7a on the transmitter chip, but to provide this function externally, for sub-5V supply applications.

Bandgap Reference 8

A bandgap reference circuit 8 is included on the chip of FIG. 1a. The purpose of this function is to generate reference voltages which are temperature and supply voltage stable. Stable reference voltages are required to bias various critical nodes within the transmitter chip.

Figure 2A:
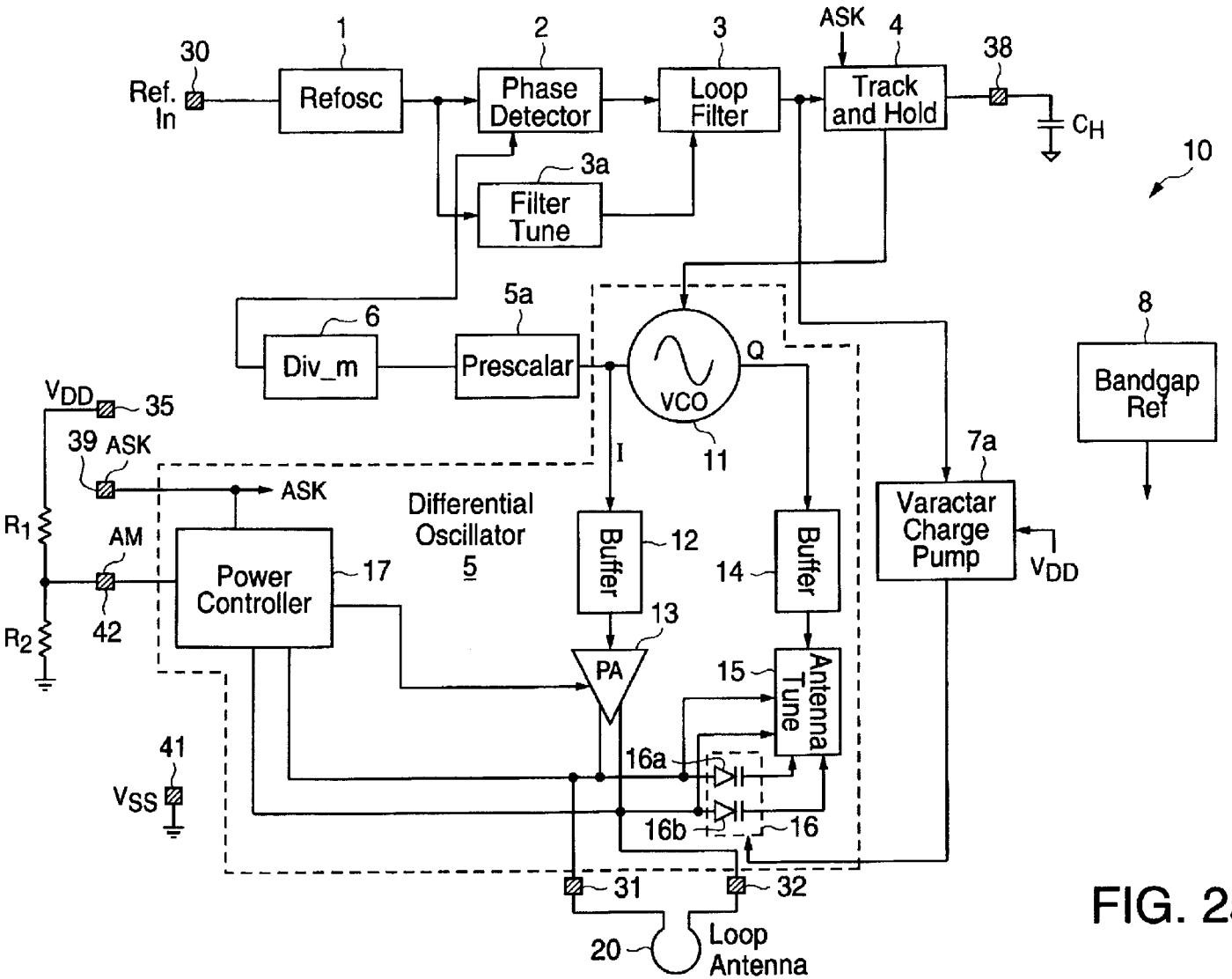
FIG. 2a shows a block diagram illustrating the functional units in a transmitter in accordance with a second embodiment of the invention.
Figure 2B:
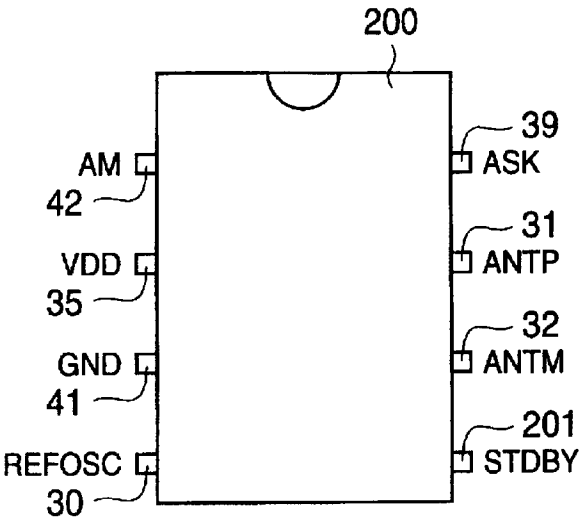

The Embodiments of FIGS. 2a and 2b

FIG. 2a shows a second embodiment of the invention. Transmitter 10 of FIG. 2a includes the following elements:

| | |
|---|---|
| Reference Oscillator | 1; |
| Phase Detector | 2; |

-continued

| | |
|---|---|
| Loop Filter | 3; |
| Filter Tune | 3a; |
| Track and hold circuit | 4; |
| Differential Oscillator | 5; |
| Prescaler | 5a; |
| Divide by M circuit | 6; |
| Varactor Charge Pump | 7a; and |
| Bandgap Reference | 8. |

Most of these components have been discussed above and, therefore, they will not be further discussed in detail here. Differential oscillator 5 of the embodiment shown in FIG. 2a includes the following elements:

| | |
|---|---|
| Voltage Controlled Oscillator | 11; |
| Buffers | 12 and 14; |
| Power Amplifier | 13; |
| Antenna Timing Circuit | 15; |
| Tuning Array | 16; and |
| Power Controller | 17. |

Differential oscillator 5, as shown in the embodiment of transmitter 10 shown in FIG. 2a, is coupled with a loop antenna 20, rather than a differential antenna L1, L2 as shown in FIG. 1a.

Differential oscillator 5 includes voltage controlled oscillator 11. Voltage controlled oscillator 11 forms a phase-locked loop with prescaler 5a, divide-by M circuit 6, phase detector 2, and loop filter 3, as has been discussed above. Track and hold 4 holds the output signal from loop filter 3 constant during transmit spaces, when the differential oscillator 5 is disabled from transmitting. Some embodiments of the invention omit track and hold 4, especially those with more complex modulation schemes. Due to the phase-locked loop, the output signal from voltage controlled oscillator 11 is at a frequency that is set by the frequency of the input signal at the reference-in pad 30 of the integrated circuit chip.

As was previously discussed, and shown in FIG. 3b, prescalar 5a outputs a signal of reduced frequency from that of voltage controlled oscillator 11. Divide-by M circuit 6 outputs a signal having a frequency divided by a factor M from that of the output signal from prescalar 5a. Phase detector 2 compares the frequency of the signal outputted by divide-by M circuit 6 with that from reference oscillator 1. The output signal from phase detector 2, filtered by loop filter 3, is input to voltage controlled oscillator 11 in order to control the frequency of the output signal from voltage controlled oscillator 11.

As was previously discussed, filter tune 3a includes a phase-locked loop tuned to the frequency of reference oscillator 1. Filter tune 3a generates a bias current for loop filter 3 and stabilizes the performance of loop filter 3 against variations due to semiconductor processing and operating temperatures.

Voltage controlled oscillator 11 generates two differential signals, I and Q, which are quadrature in phase. The in-phase signal I is output from differential oscillator 5 to prescalar 5a. The in-phase signal I is also input, through buffer 12, to power amplifier 13. Power amplifier 13 provides the output signal that drives antenna 20.

The quadrature signal Q is provided, through buffer 14, to antenna tune circuit 15. Antenna tune circuit 15 adjusts the resonant frequency of the LC circuit formed by antenna 20 and tuning array 16 to correspond with the frequency of the output signals from voltage controlled oscillator 11. Tuning array 16 can, for example, include differential varactors 16a and 16b. Differential varactors 16a and 16b can be continuously variable varactors or discrete varactors which include a switched capacitor array. Varactors 16a and 16b provide a desired amount of capacittance to tune antenna 20 to the operating frequency of VCO 11.

Power amplifier 13 provides a differential output signal into antenna 20. The LC circuit, including antenna 20, is tuned such that a resonance frequency of the LC circuit matches the frequency of the differential output signal from power amplifier 13, which is the same as the operating frequency of voltage controlled oscillator 11, by antenna tune circuit 15. Antenna tune circuit 15 compares the phase of the differential output signal to antenna 20 with the quadrature output signal Q from voltage controlled oscillator 11 and varies the effective capacitance of tuning array 16.

In embodiments where tuning array 16 includes varactors 16a and 16b, varactors 16a and 16b can be operated in either full depletion mode or in enhancement mode, thereby creating high quality (Q) on-chip MOS capacitors. As a result of the high quality MOS capacitors, it is possible to tune the LC circuit including external antenna 20 without degrading the overall quality of the antenna network.

Power controller 17 provides a negative feedback closed loop built around antenna 20 in order to control and modulate the transmit power. In the embodiment shown in FIG. 2a, power levels are controlled at AM pad 42 by external resistors R1 and R2 while the data signal is input at ASK pad 39. Power controller 17 outputs a signal that controls the gain of power amplifier 13.

Power controller 17 is controlled by an AM voltage signal input on pad 42. Data is input at pad 39. The data signal, shown here as an amplitude shift keyed (ASK) data sequence, is input to power controller 17. Power controller 17 modulates the output power of the transmitter in response to the data stream. In some embodiments, power controller 17 may include a data encoder 40 (FIG. 1a). Embodiments of the invention can utilize any data transmission scheme (e.g., XDSL). Further, Power controller 17 may use frequency modulation instead of amplitude modulation by, for example, modulating the control signal to varactors 16 or the control signal to VCO 11.

Figure 5A:
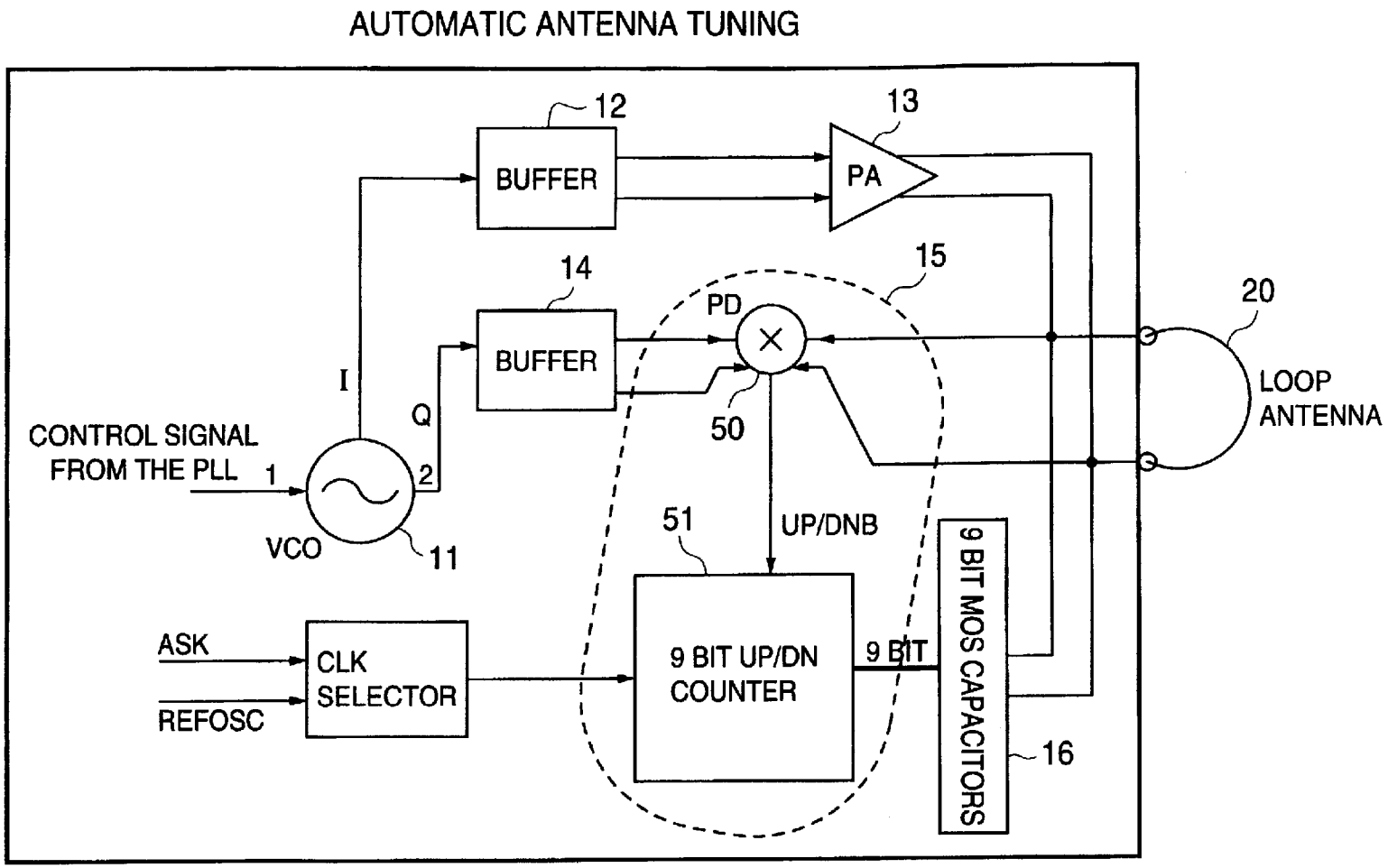
FIGS. 5a through 5j show block diagrams and circuit diagrams of the antenna tuning portion of a transmitter according to the present invention.

FIGS. 5a through 5j show block diagrams and circuit diagrams of portions of a transmitter according to the present invention. FIG. 5a shows a block diagram of the automatic tuning portion of transmitter 10. Voltage controlled oscillator 11, as shown in FIG. 2a, is part of the phase-locked-loop formed by phase detector 2, loop filter 3, track-and-hold 4, VCO 11, Prescaler 5a, and Div_M circuit 6. VCO 11 is coupled to buffer 12 which is coupled to provide energy to loop antenna 20 at a transmit frequency set by VCO 11.

VCO 11 is also coupled, through buffer 14, to antenna tune 15. Antenna tune 15 controls capacitor tuning array 16 so that the resonant frequency of the circuit containing loop antenna 20 can be controlled by switching the capacitors of capacitor array 16 into the circuit. Antenna tune 15 includes phase detector 50 and up/down counter 51. Phase detector 50, compares the signals from VCO 11 with the signal from loop antenna 20 and adjusts the capacitance of capacitor array 16 by causing up/down counter 51 to be adjusted.

Figure 5B:
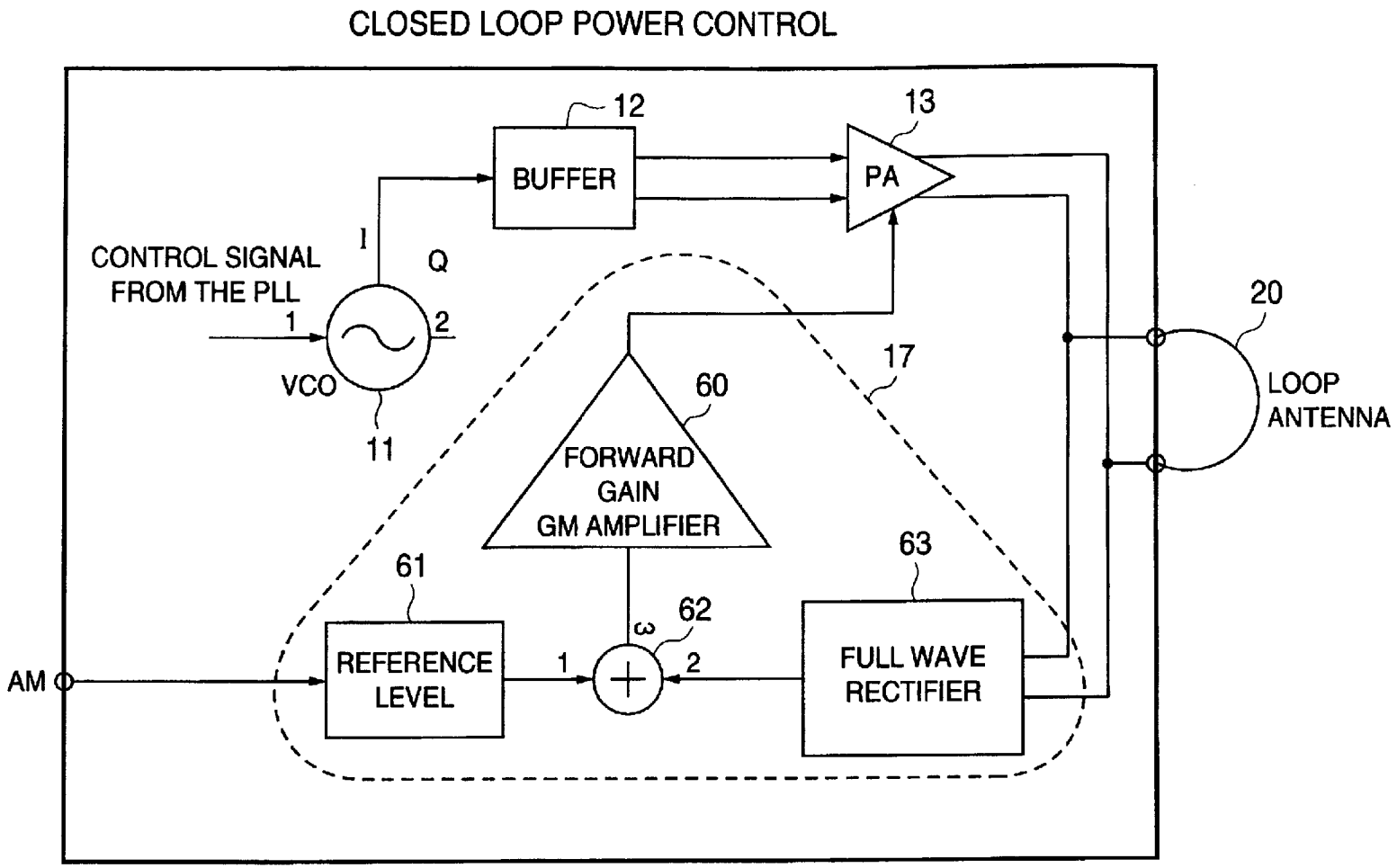

FIG. 5b shows power controller 17 coupled to power amplifier 13. Power controller 17, as shown in FIG. 5b, includes a forward gain GM amplifier 60, a summer 62, reference level 61, and full wave rectifier 63. The output signal from reference level 61, which depends on the AM signal, and the output signal from full wave rectifier 63, which depends on the signal from loop antenna 20, are summed in adder 62 and input to amplifier 60. The output signal from amplifier 60 determines the gain of power amplifier 13.

Figures 1, 5C:
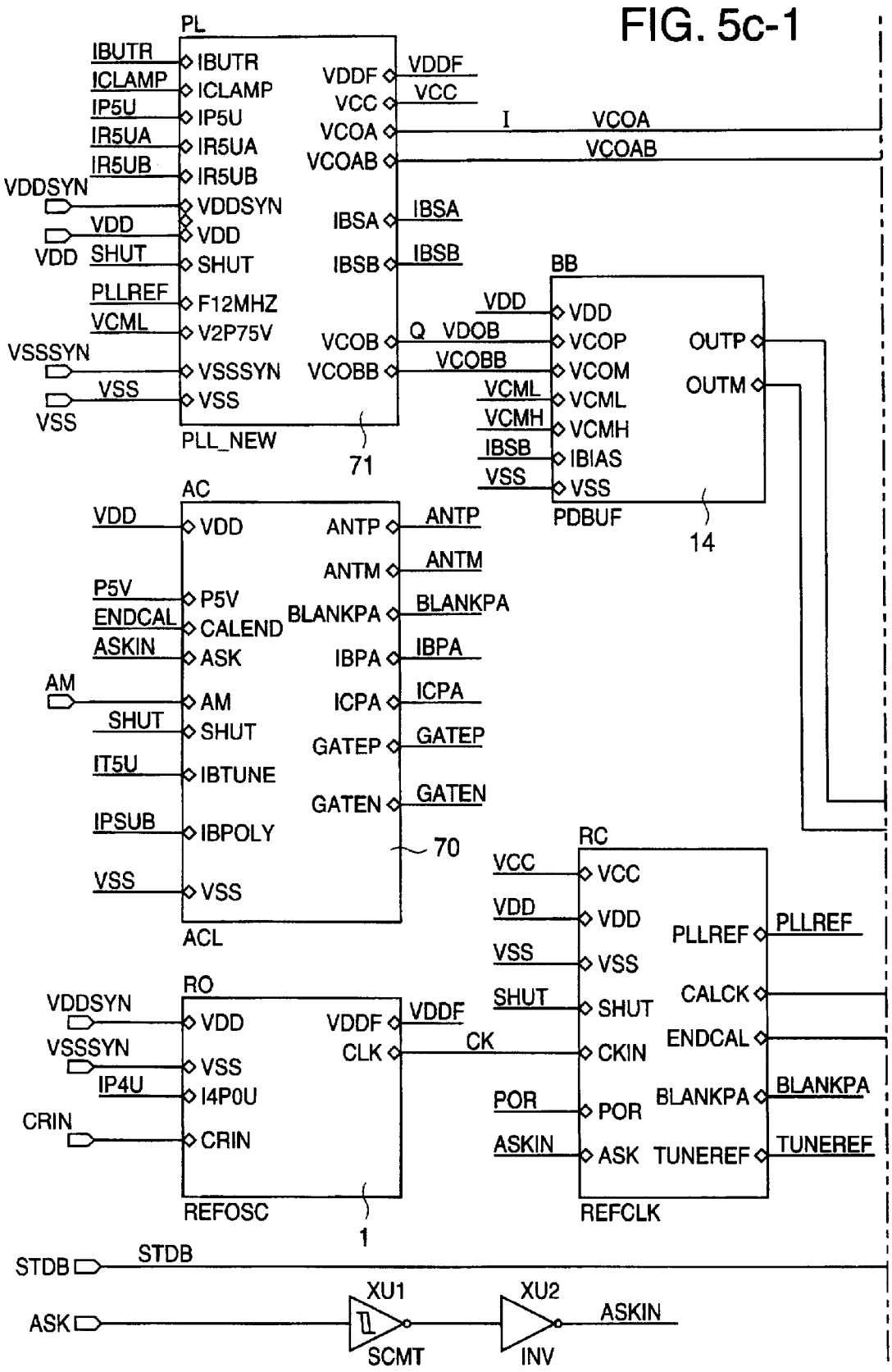
Figures 2, 5C:
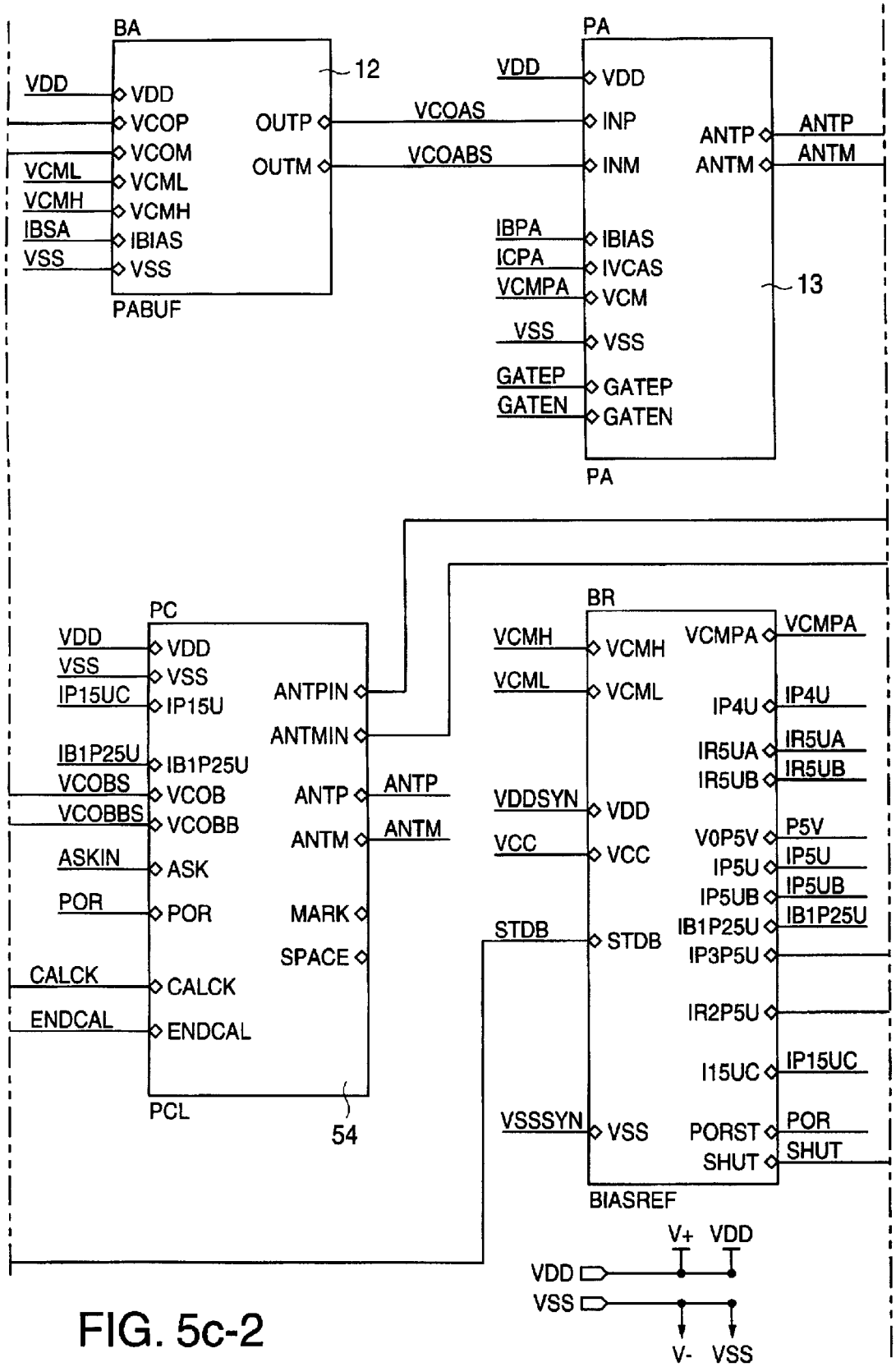
Figures 3, 5C:
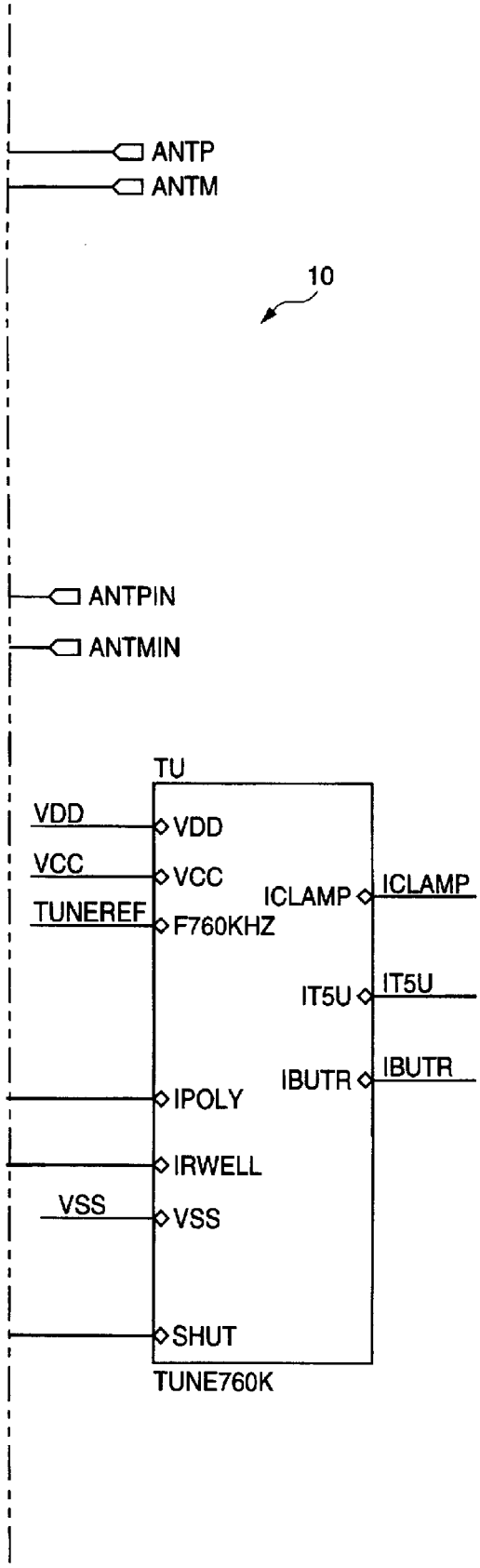

FIG. 5c shows a block diagram of transmitter 10. PLL 71 includes VCO 11, prescaler 5a, Div_M circuit 6, phase detector 2, loop filter 3, and track and hold 4. Amplitude control loop 70 includes power controller 17. Phase control loop 54 includes antenna tune 15 and capacitor array 16.

Figures 1, 5D:
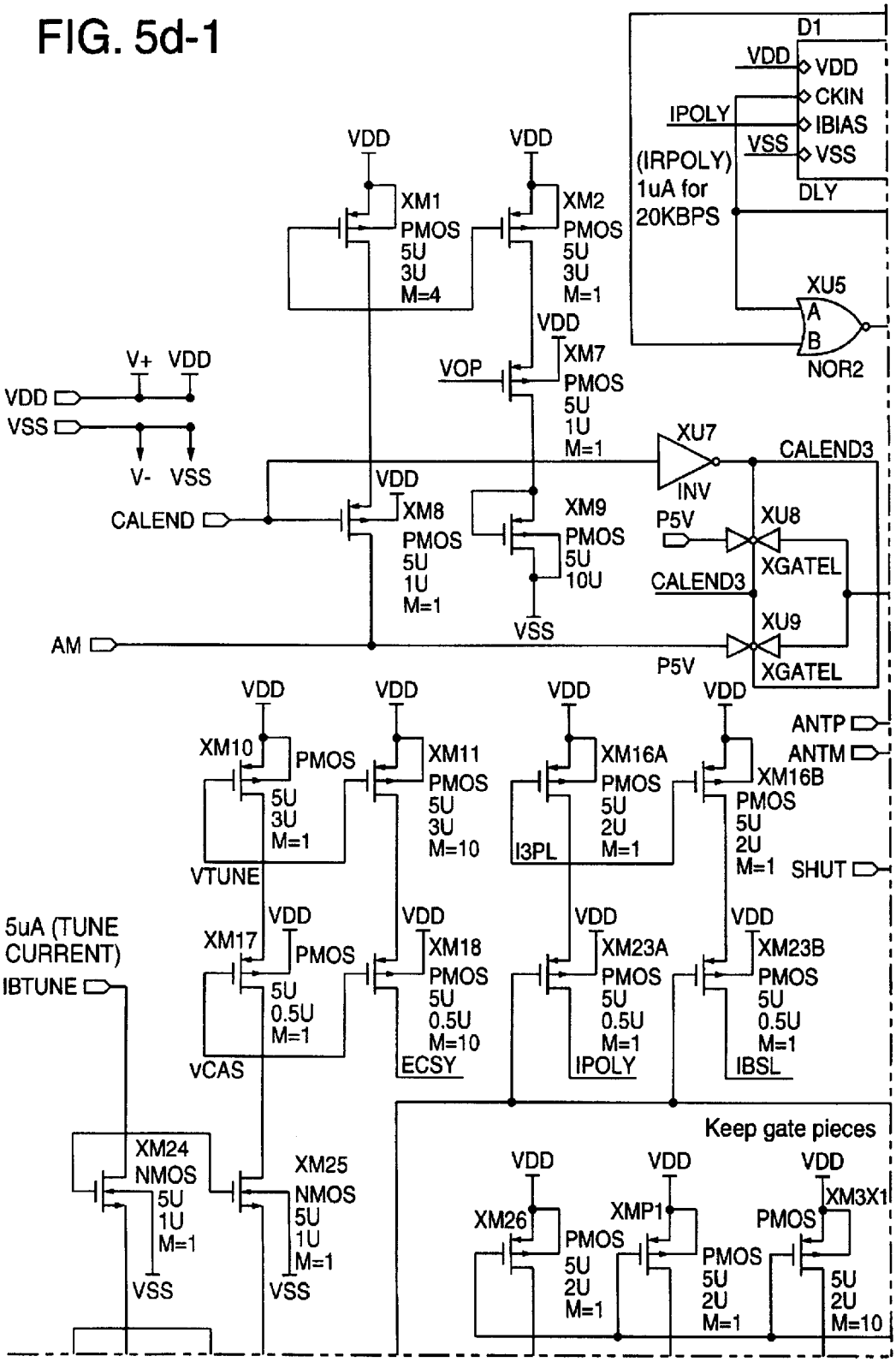
Figures 2, 5D:
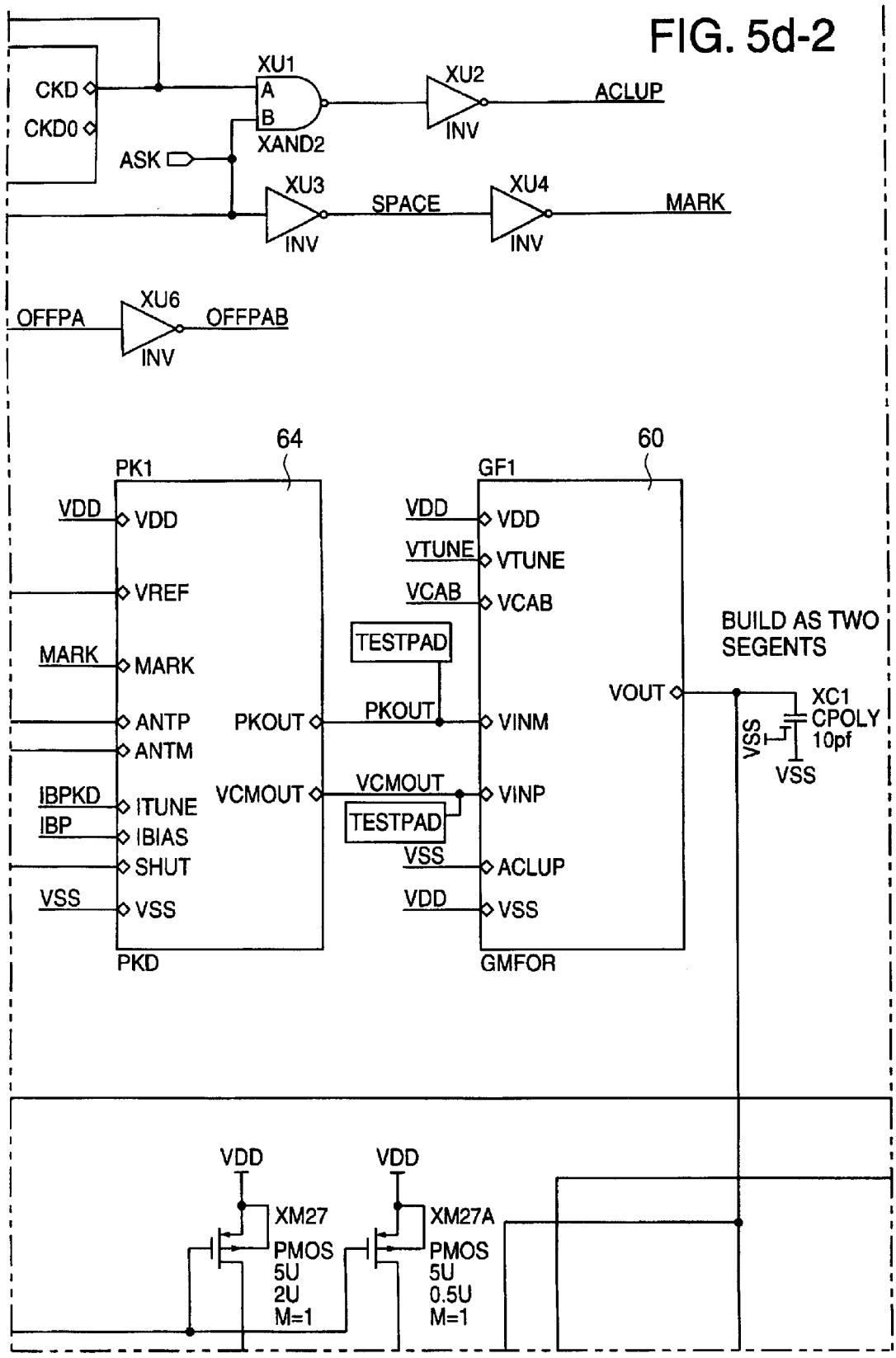
Figures 3, 5D:
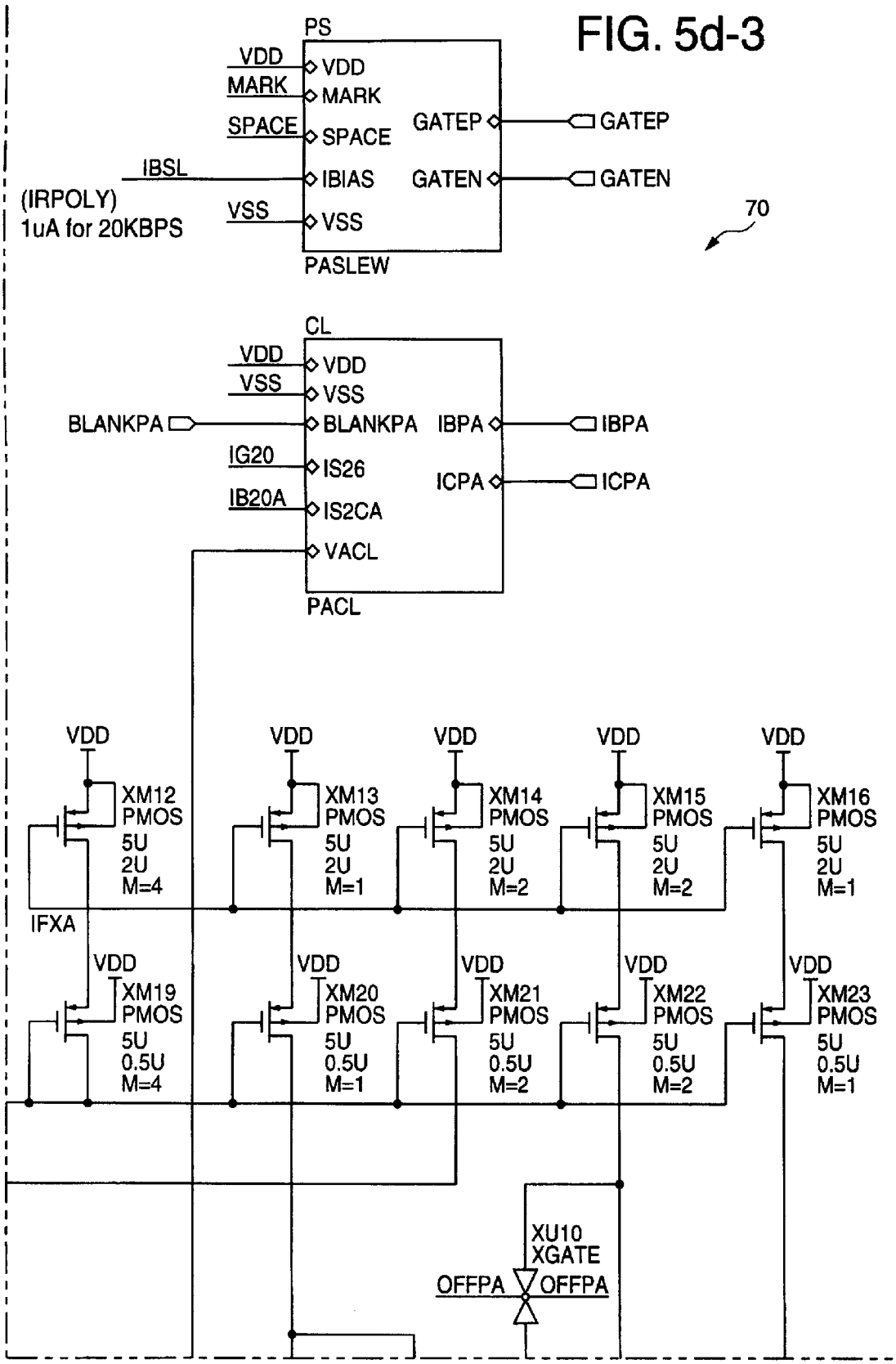
Figures 4, 5D:
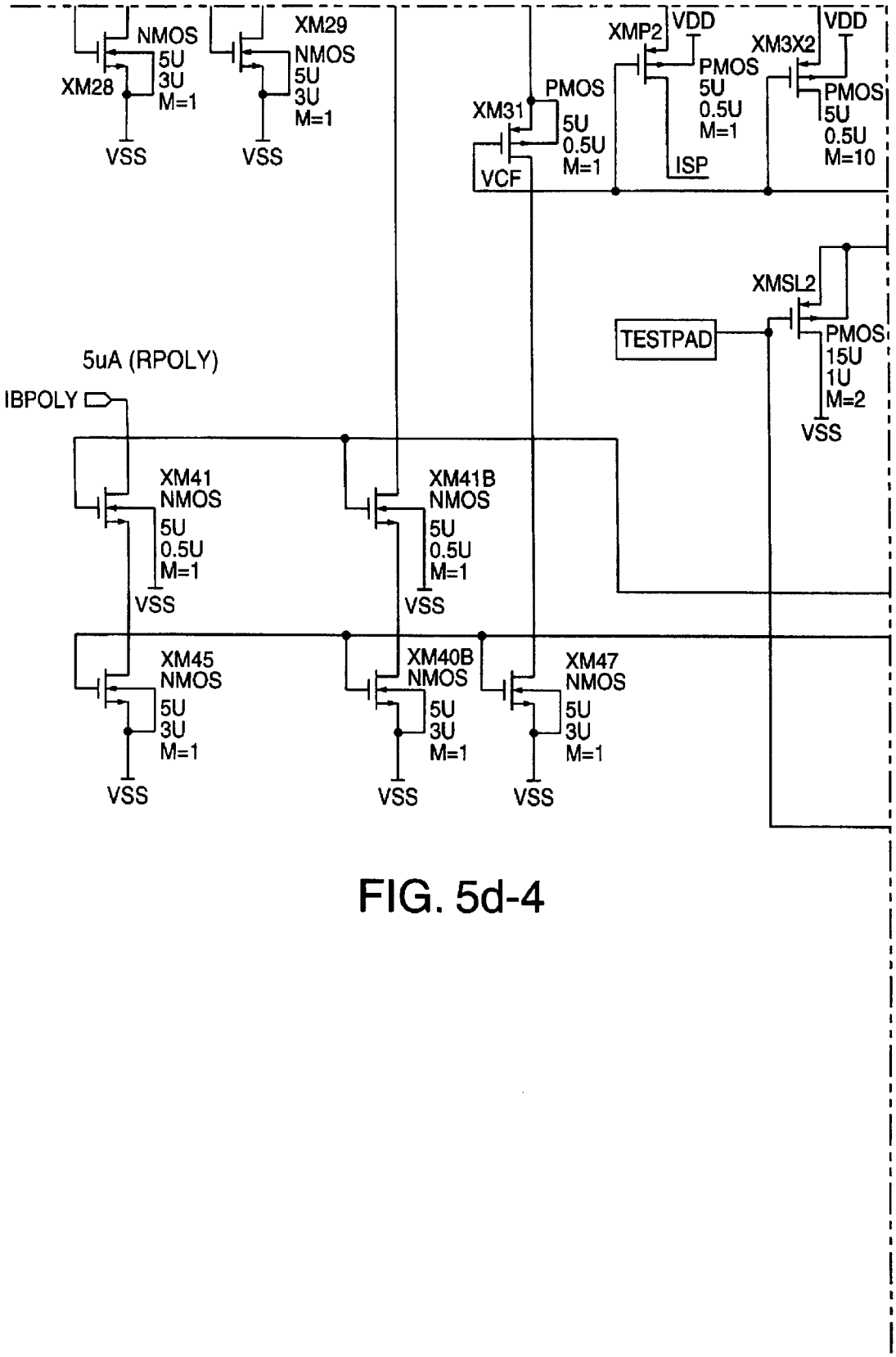
Figures 5, 5D:
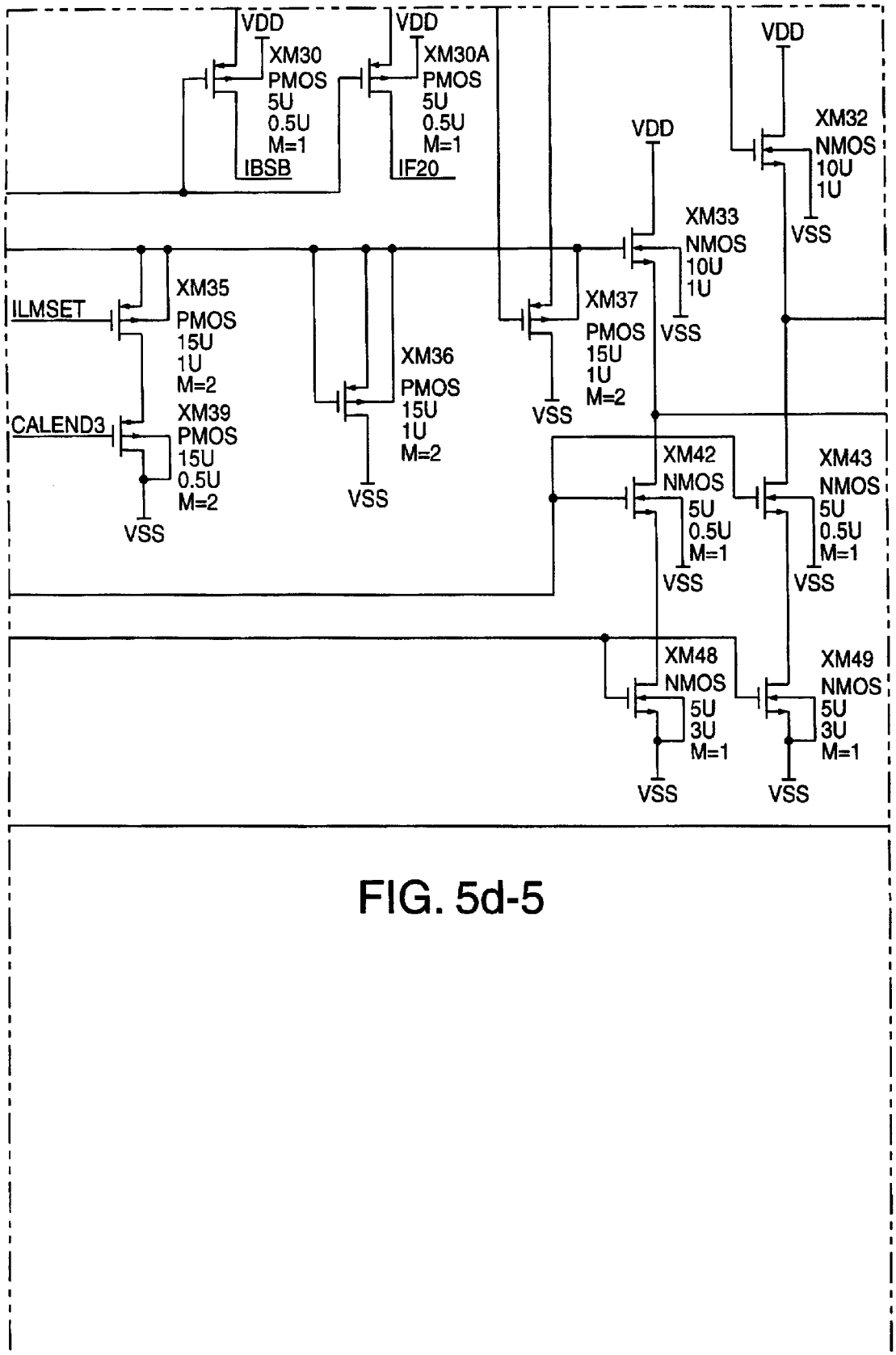
Figures 5, 5D, 6:
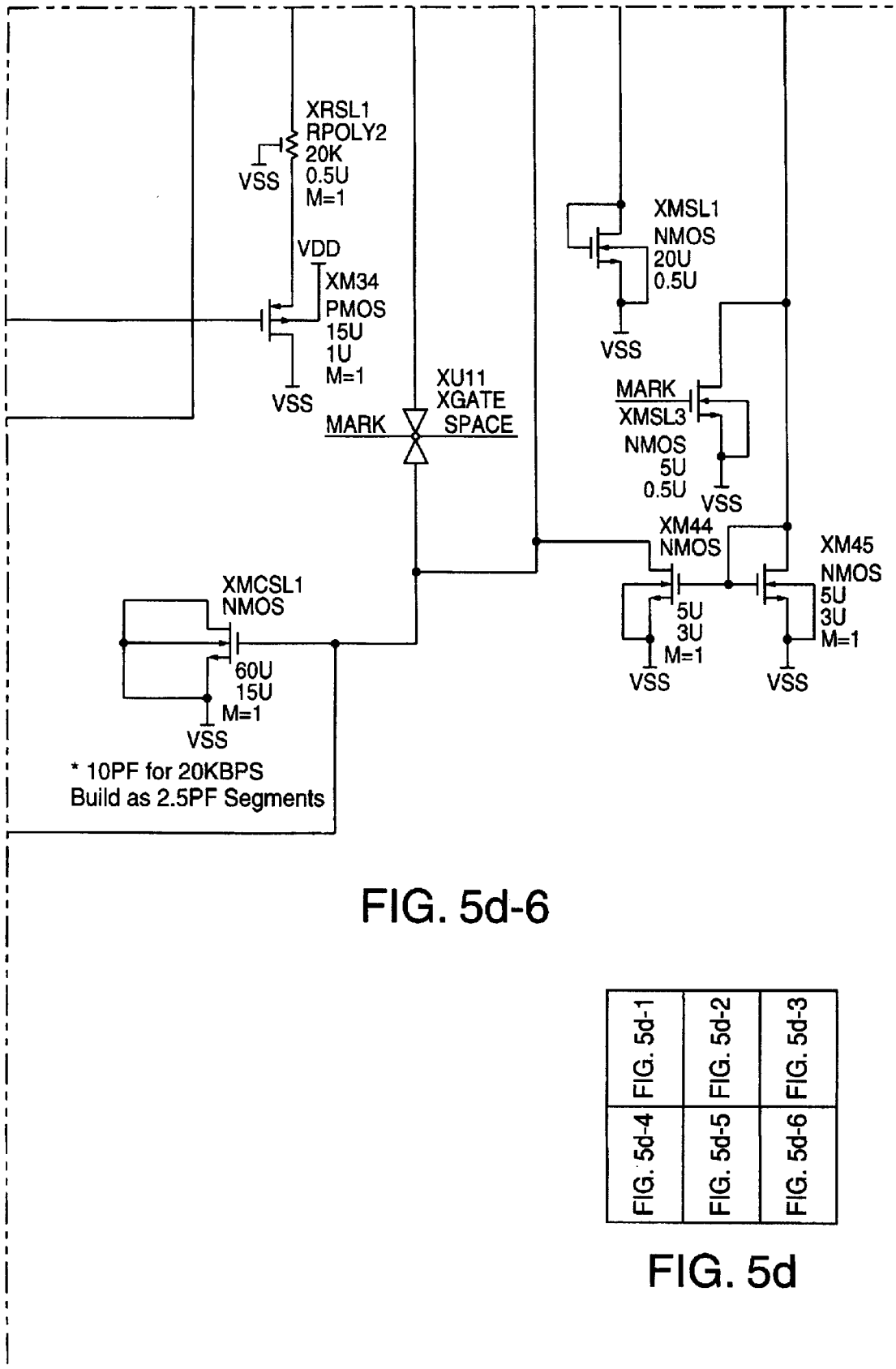
Figures 1, 5E:
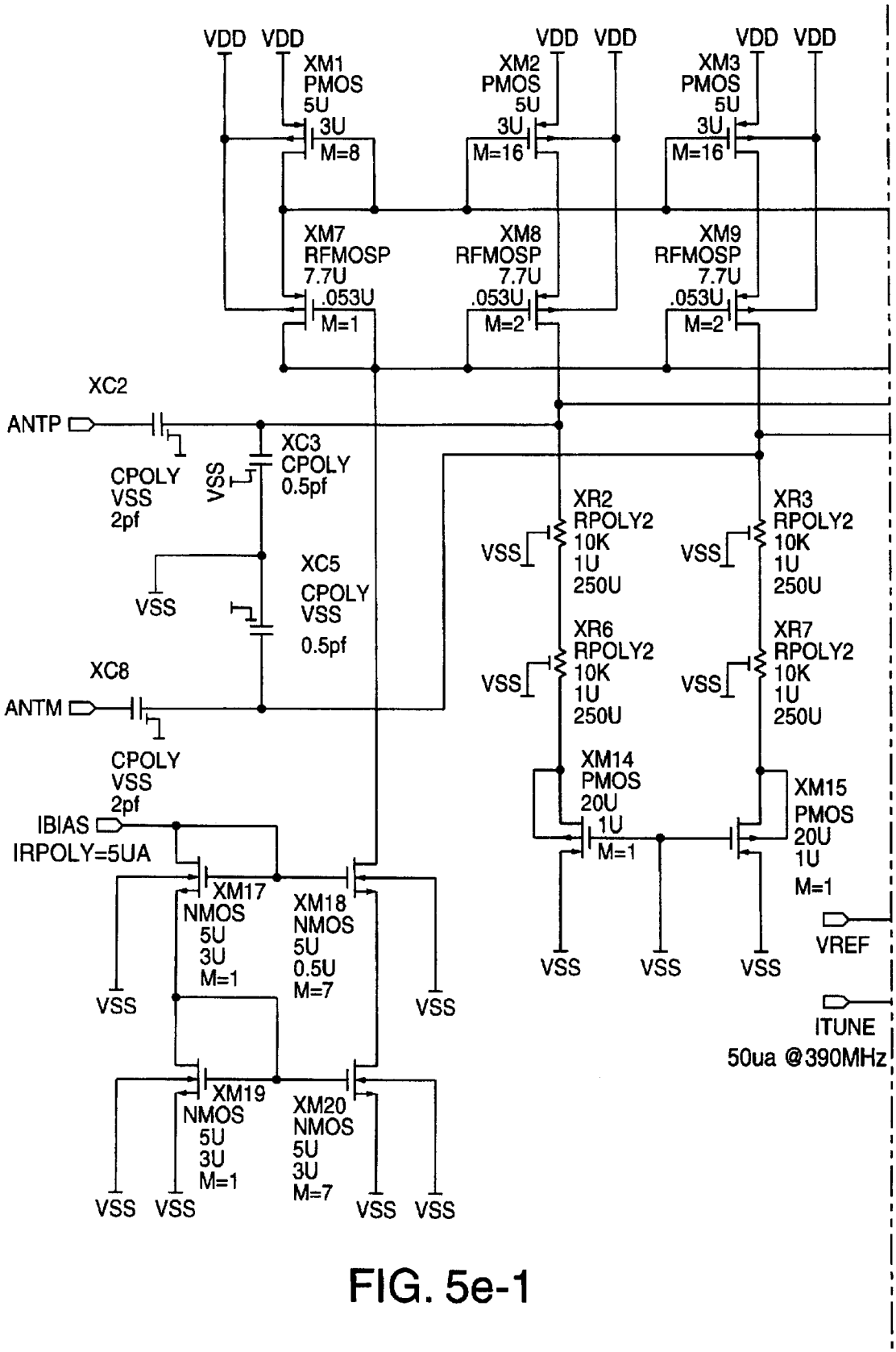
Figures 3, 5E:
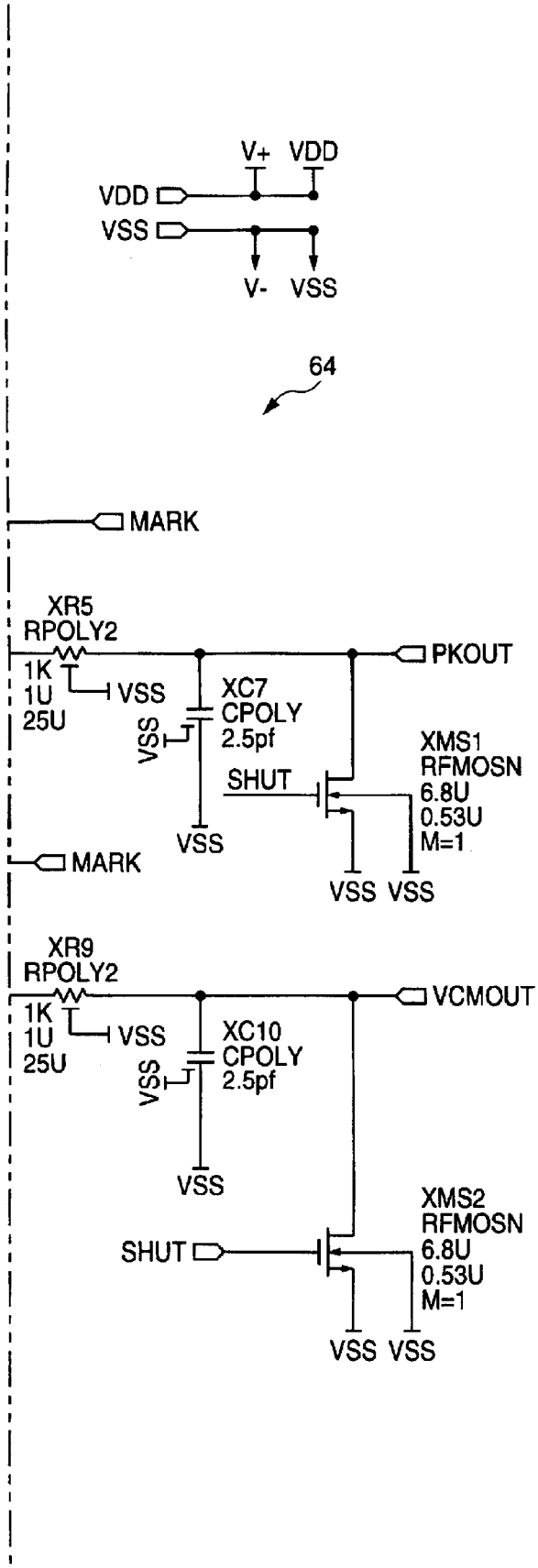
Figure 5F:
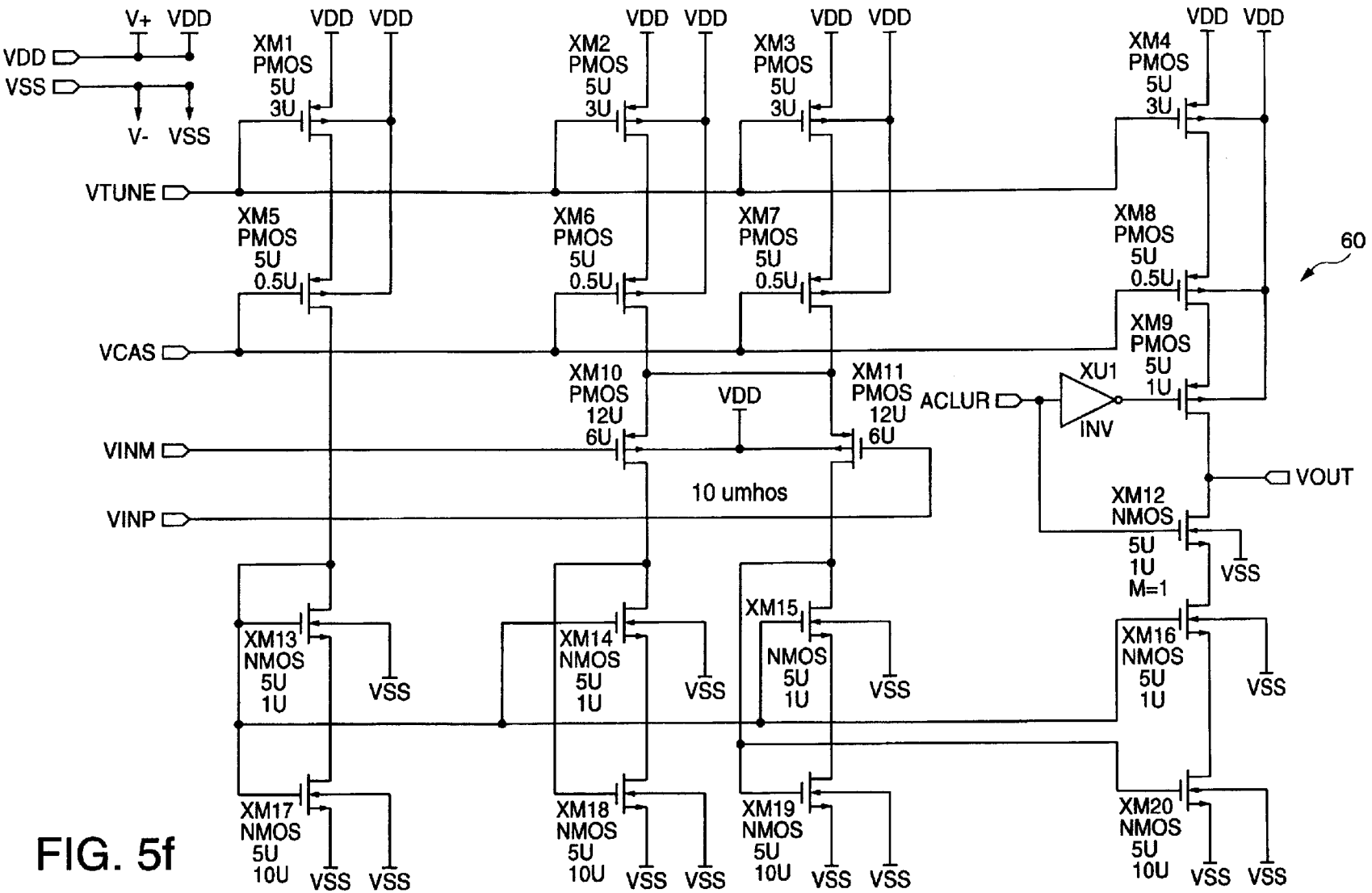
Figures 1, 5G:
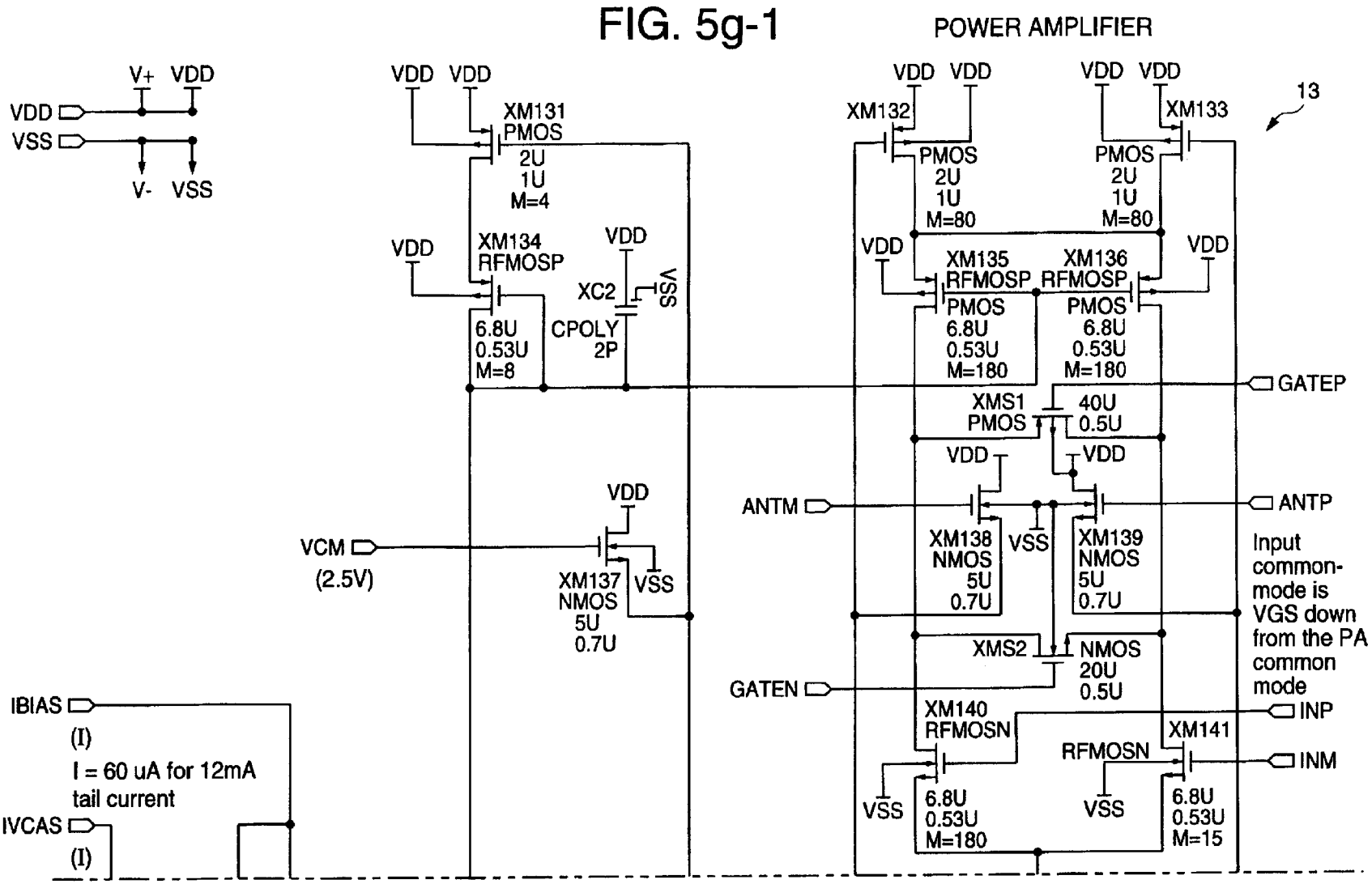
Figures 2, 5G:
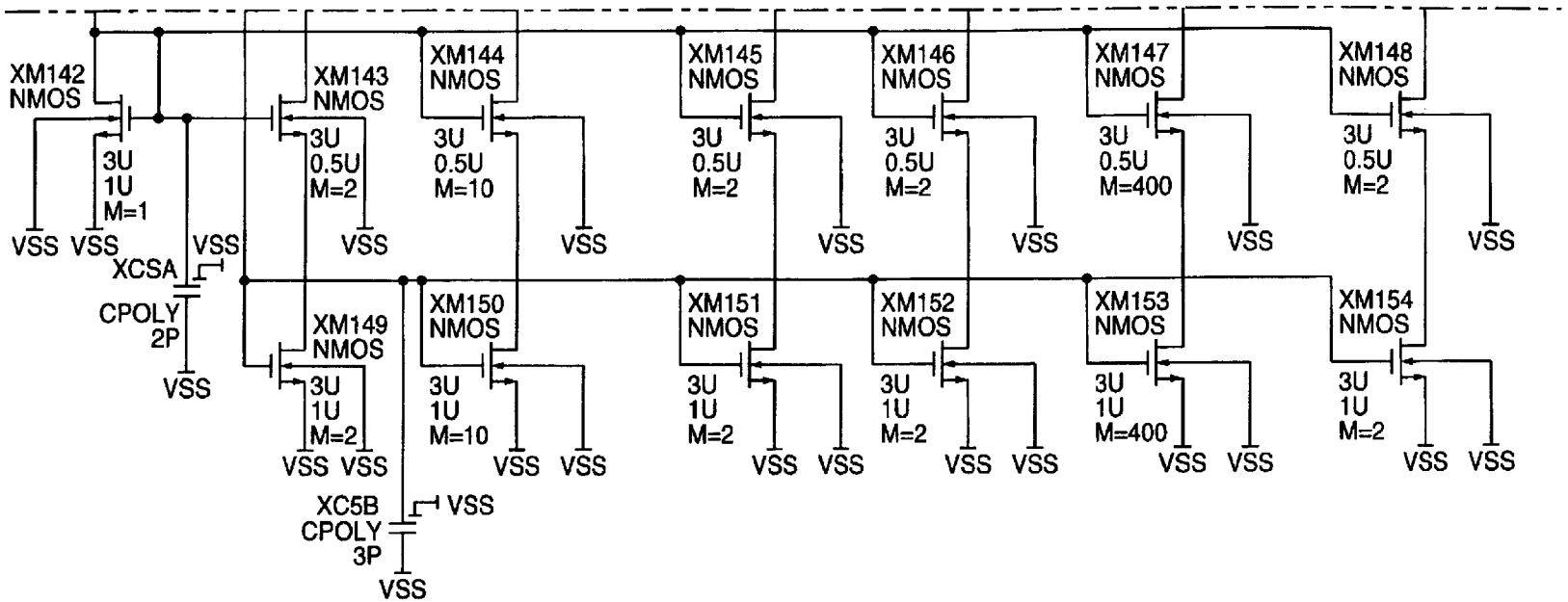

FIG. 5d shows a circuit diagram of amplitude control loop 70. Loop 70 includes amplifier 60 and a detector 64. A circuit diagram of the RMS detector of the antenna signal 64 is shown in FIG. 5e. A circuit diagram of amplifier 60 is shown in FIG. 5f. A circuit diagram of power amplifier 13 is shown in FIG. 5g.

Figure 5H:
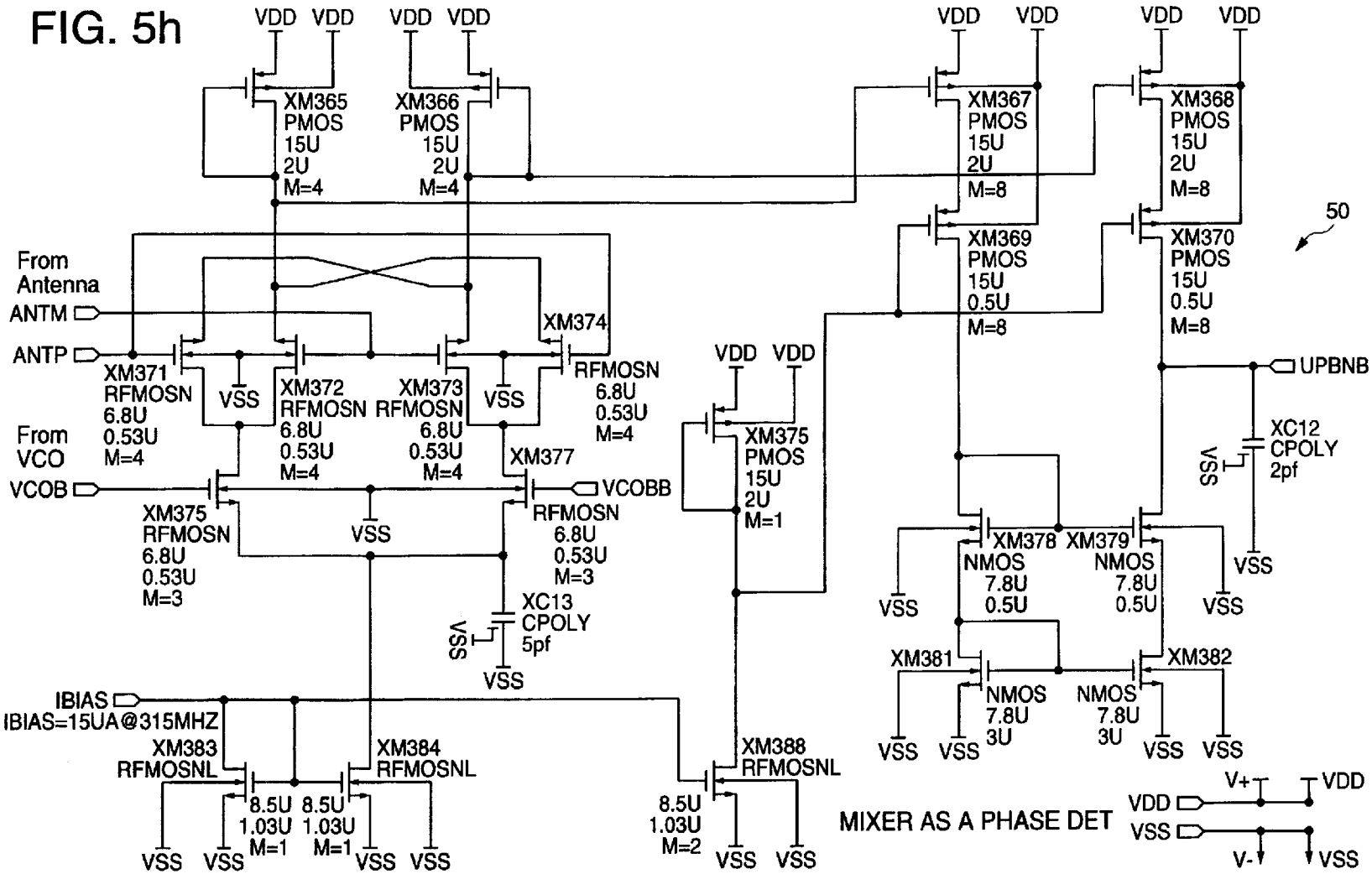
Figures 1, 5I:
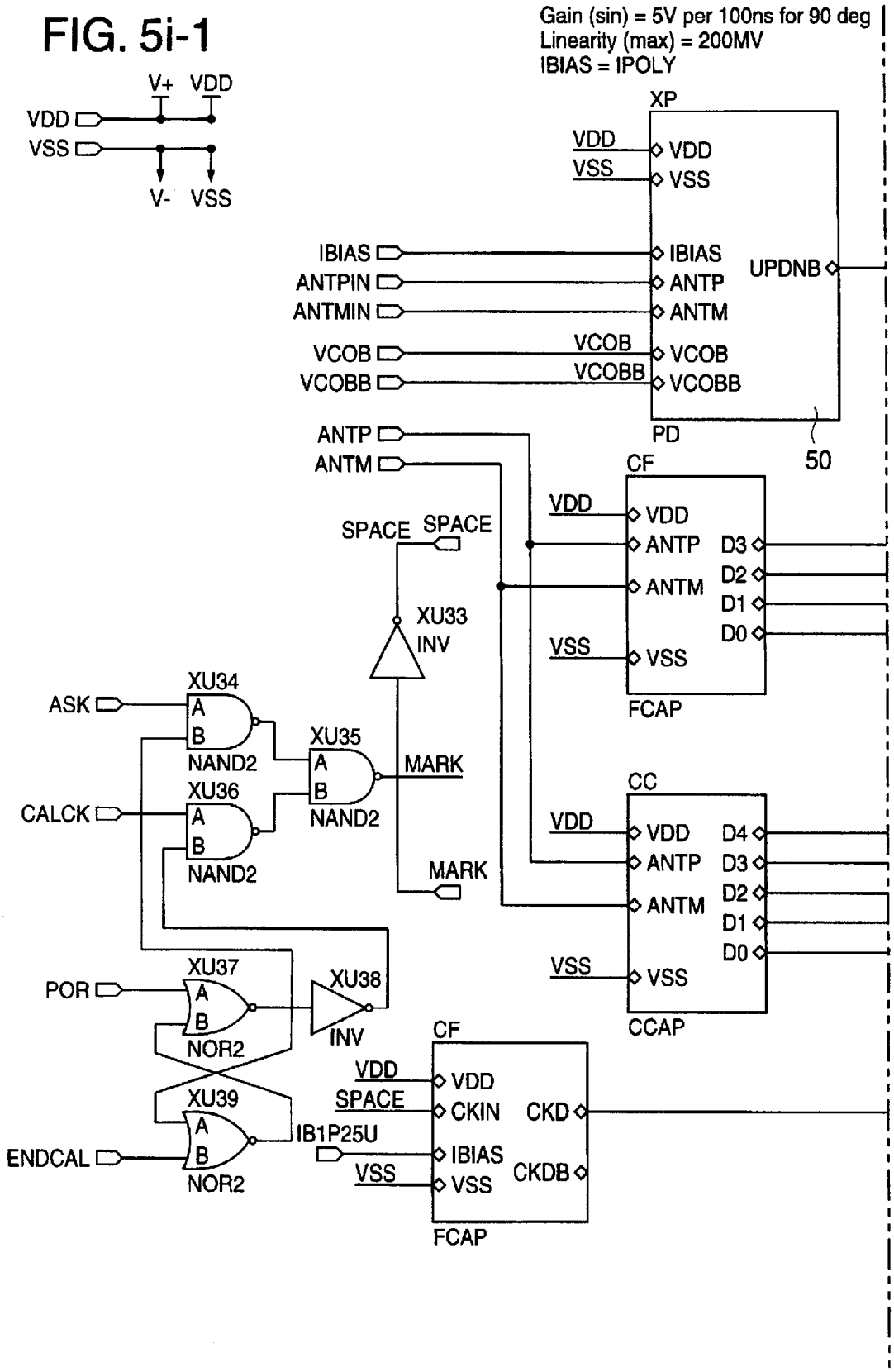
Figures 2, 5I:
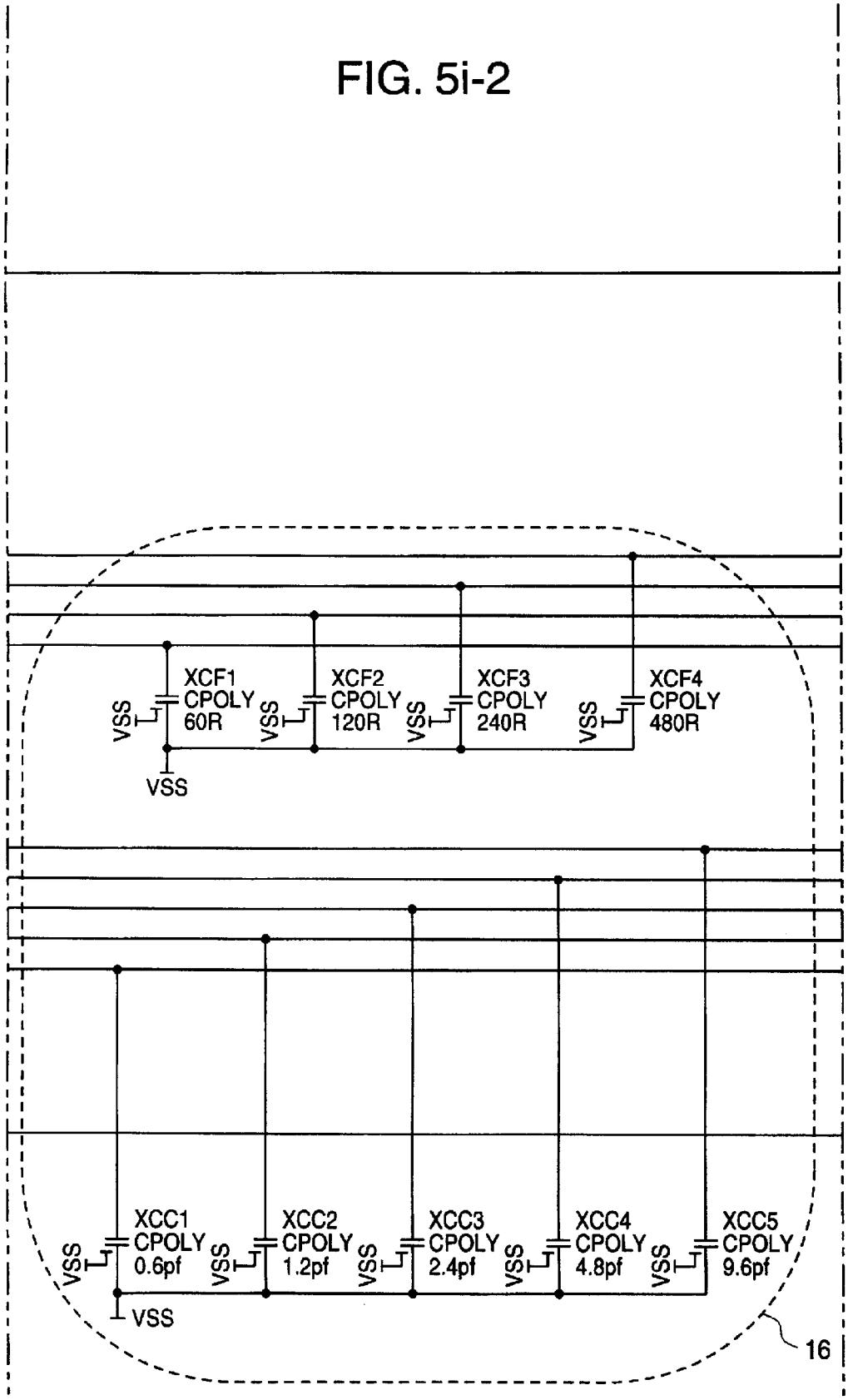
Figures 3, 5I:
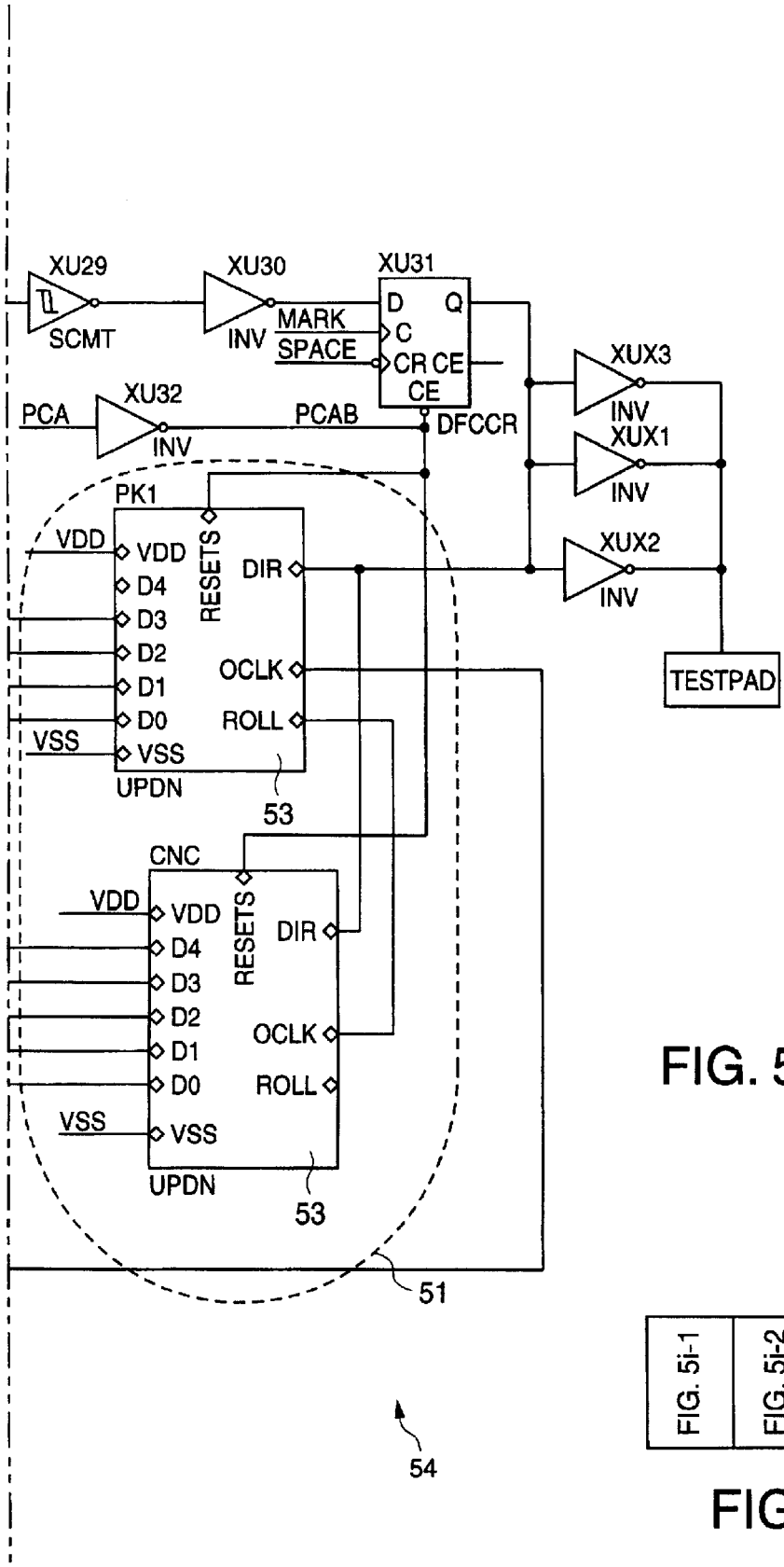
Figures 1, 5J:
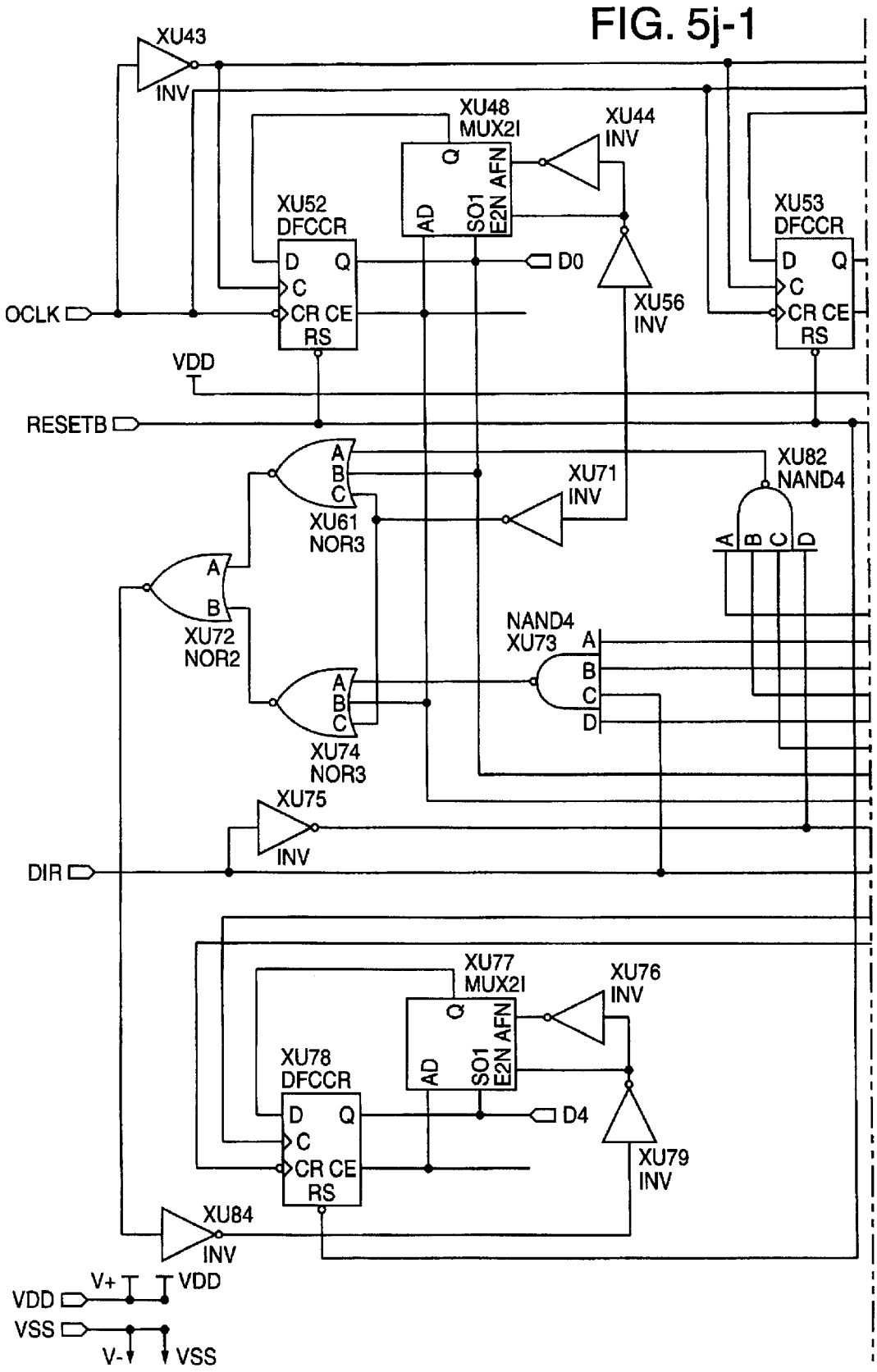
Figures 2, 5J:
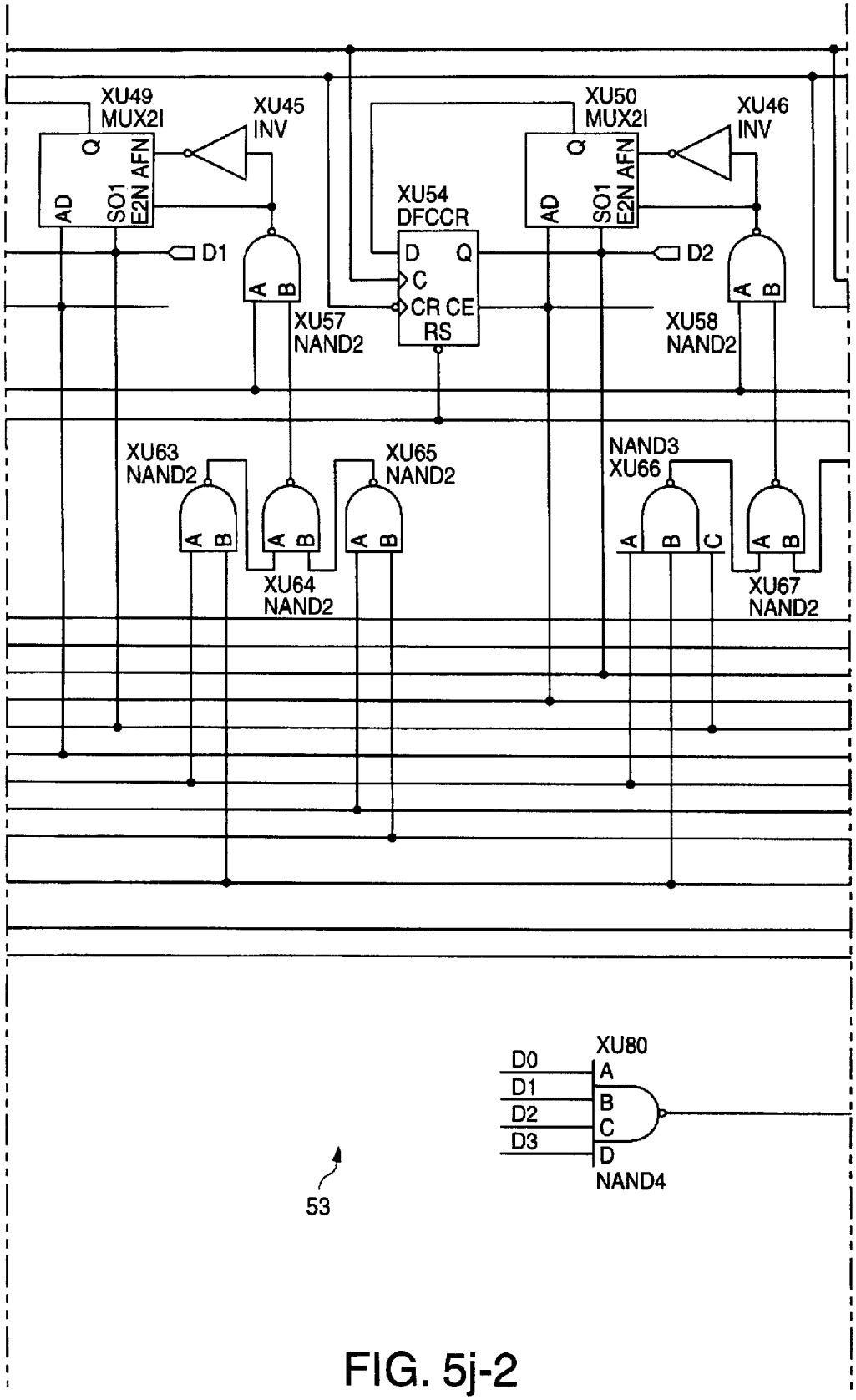
Figures 3, 5J:
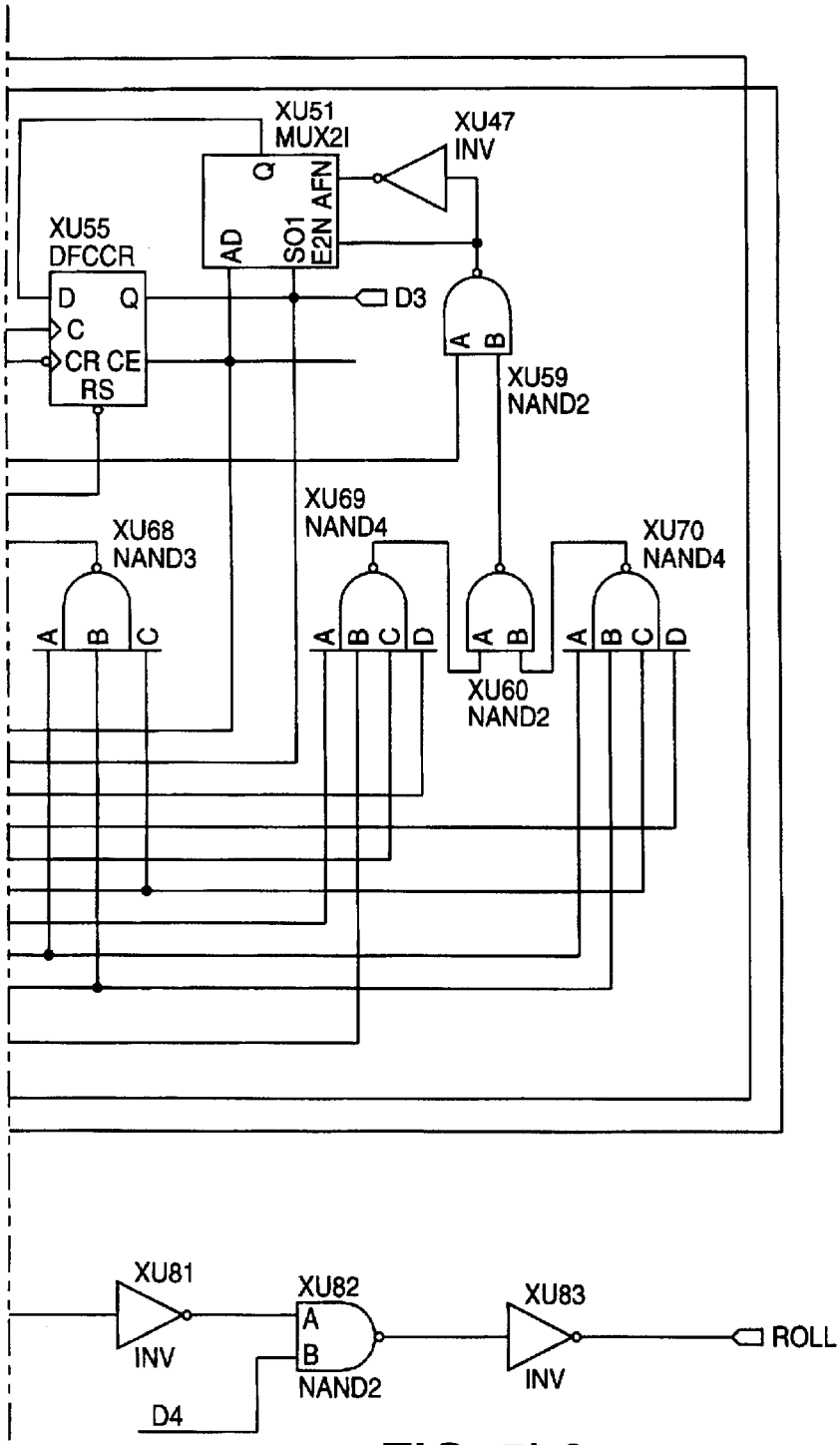

A circuit diagram of phase detector 50 is shown in FIG. 5h. FIG. 5i shows a circuit diagram of phase control loop 54, including up/down counter 51, phase detector 50, and capacitor array 16. In the circuit of FIG. 5i, up/down counter 51 is formed from two counters 53. The circuit diagram for counters 53 is shown in FIG. 5j.

In general, all of the above discussed components can be produced on a single integrated circuit with CMOS technology.

Alternative Embodiments and Enhancements

By implementing on a CMOS integrated Chip, it is economical to include encoder functions on the same IC since most of the applications for this type of radio transmitter include an encoder before the transmitter. The encoder can be either fixed or variable (i.e., programmable, like a microprocessor).

Other embodiments include the addition of a shutdown mode for low-power duty-cycling of the invention.

An encoder such as encoder 40 of FIG. 1a, may be included in power controller 17, or between data input pad 39 and power controller 17. The encoder generates an on/off data stream which ultimately turns on/off a transmitter function.

The encoder on/off data stream can either be fixed or variable. An example of a fixed data stream would be one permanently programmed in an encoder circuit with either switches or jumper connections. An example of a variable encoder data stream is one similar to that used in rolling code encoder systems. Rolling code schemes are generally found in high security applications where the user is trying to evade capture of a valid encoder data stream for later broadcast to a receiving decoder. Generally, these rolling code encoder schemes embody erasable and reprogrammable memory circuits. In that embodiments of this invention now allow full integration of at least one embodiment of a transmitter function, all of the encoder circuit schemes can be integrated on one single silicon integrated circuit at a very low cost.

In that embodiments of this invention are built on a CMOS process technology, a microprocessor or similar computing circuit element can be combined on the same silicon integrated circuit with the invention since modern low-cost microprocessors are almost always constructed on a similar process.

The embodiments of the invention have certain performance limits at the present time that are expected to change in the future. One such limit is the achievable upper operating frequency limit. One skilled in the art will readily recognize that embodiments disclosed here can continue to be scaled as CMOS technology is scaled to continue applying the invention at higher and higher operating frequencies.

The United States agency that regulates unlicensed radio or RF transmitters, the FCC, has allocated certain frequency bands and emission types for which this type of device is intended. There are several regulating bodies in other parts of the world which in a similar manner control these same issues. In some instances, the World's other regulatory agencies are more restrictive in their operating rules than is the FCC. Embodiments of this invention can be tailored for operation under all of the various regulatory agency provisions.

Figure 4:
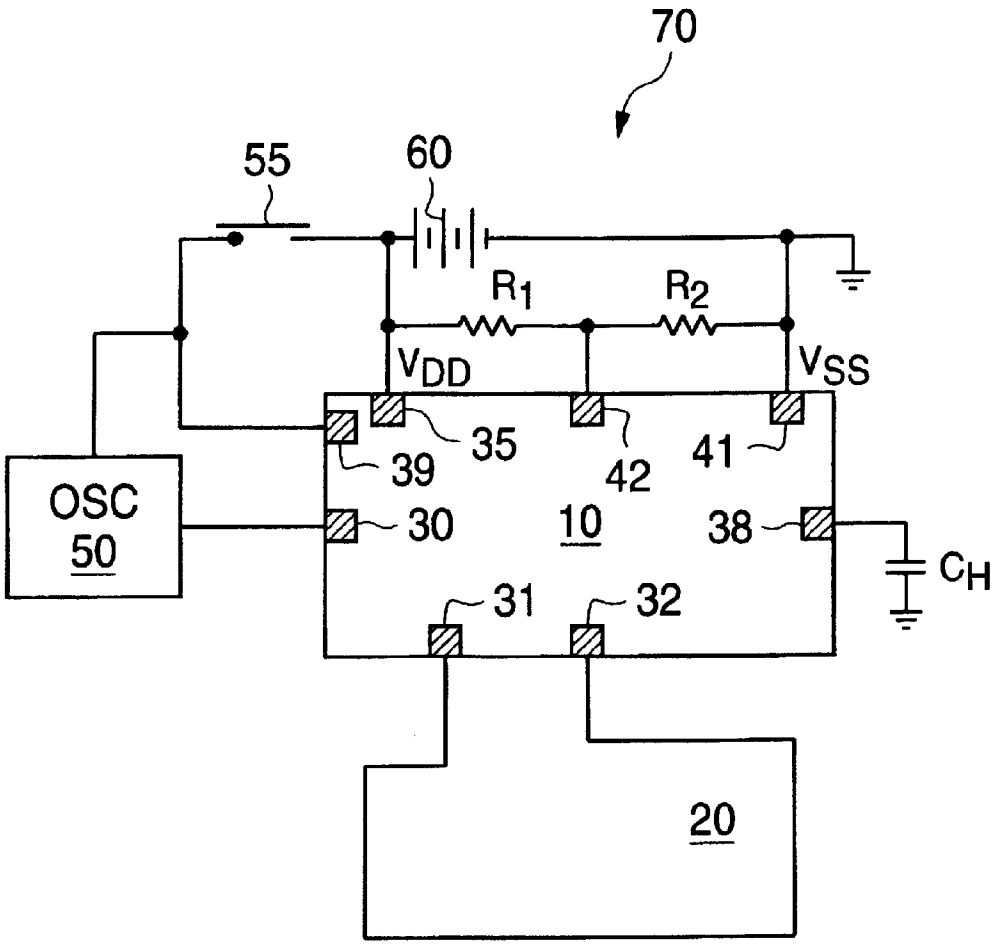
FIG. 4 shows a block diagram of an integrated transmitter according to the present invention.

The primary application of this invention, but certainly not the only application, is for automotive keyless entry, garage door openers, home keyless entry, security systems, and remote door bell ringers. Obviously, there are numerous other applications that combine a simple transmitter with a digital data stream generation circuit. FIG. 4 shows an embodiment of the invention as a remote transmitter. Remote 70 includes battery 60, transmitter 10, antenna 20, oscillator 50 and switch 55. In order to preserve battery 60, R1 and R2 are as large as possible or switched in order to draw current only when needed. Oscillator 50 provides the reference input frequency for reference oscillator 1 (FIG. 2a).

This invention's uniqueness is further exemplified by the observation that a complete RF radio transmitting system can be built with no other external RF components except an antenna.

While the embodiments specifically discussed here illustrate an AM type transmitter, one skilled in the art will recognize that an FM transmitter with virtually the same circuit techniques described herein can be built. The modifications that are necessary to build FM transmission entail changing the phase-locked loop division ratio or reference frequency by the requisite frequency deviation for the system. This will force the control system to tune the antenna between any of a number of frequencies determined by the phase-locked loop feedback divisor or reference frequency values. In the limit, these values approach infinity. A simpler FM modification is also possible with the invention, namely varying the varactor diode bias directly. This is a more traditional technique of FM modulation, although not previously implemented on CMOS silicon at the frequencies made possible by this invention.

As a result of the economy of scale associated with CMOS process technology, an extension of this invention is to build several transmitters on the same silicon die. This will allow one to build low-cost multi-channel systems which are either AM, FM, or otherwise. A multi channel-channel system enhances the achievable data rate in much the same manner that increasing a digital systems data bus or address bus width.

The embodiments described in this disclosure are examples only and are not intended to be limiting. One skilled in the art will recognize obvious variations, each of which are intended to be within the scope and spirit of this invention. As such, the invention is limited only by the following claims.

What is claimed is:

1. A transmitter comprising:

a voltage-controlled oscillator having an operating frequency;

an antenna, the antenna forming part of a tuned circuit coupled to the voltage-controlled oscillator, a differential structure of varactor diodes;

a varactor charge pump to provide a bias charge for varactor diodes in the differential structure of varactor diodes; and a tuned circuit including the antenna and the differential structure of varactor diodes, wherein the differential structure of varactor diodes tunes the resonance point of the antenna to the frequency of the voltage-controlled oscillator.

2. The transmitter of claim 1, wherein the voltage-controlled oscillator is coupled serially with a phase detector and a loop filter to form a phase-locked loop.

3. The transmitter of claim 2, wherein the phase detector is further coupled to a reference signal so that the operating frequency of the voltage controlled oscillator is related to the frequency of the reference signal.

4. The transmitter of claim 2, wherein the phase-locked loop further includes a prescalar and a divide-by M circuit coupled between the voltage-controlled oscillator and the phase detector.

5. The transmitter of claim 4, wherein the voltage controlled oscillator and the phase-locked loop are formed on a single integrated circuit.

6. The transmitter of claim 2, further including a reference oscillator supplying a signal of a reference frequency to the phase detector, wherein the reference oscillator, the voltage controlled oscillator, and the phase-locked loop are formed on a single integrated circuit.

7. The transmitter of claim 6, wherein the reference oscillator is of the Colpitts variety and is coupled to receive a signal from a timing device external to the single integrated circuit.

8. The transmitter of claim 1, wherein a power amplifier is coupled between the voltage controlled oscillator and the antenna.

9. The transmitter of claim 8, wherein the gain of the power amplifier is controlled by a power controller.

10. The transmitter of claim 9, wherein the power amplifier, the voltage-controlled oscillator, and the power controller are formed on a single integrated circuit.

11. The transmitter of claim 1, wherein the differential structure of varactor diodes, the voltage-controlled oscillator, and the varactor charge pump are formed on a single integrated circuit.

12. The transmitter of claim 1, wherein the veractor diodes include an array of capacitors that can be switched in and out of the tuned circuit.

13. The transmitter of claim 1, wherein the differential structure of varactor diodes and the voltage-contrlled oscillator are formed on a single integrated circuit.

14. The transmitter of claim 1, further including a charge pump supplying a voltage to the voltage-controlled oscillator, wherein the charge pump and the voltage-controlled oscillator are formed on a single integrated circuit.

15. The transmitter of claim 1, further including a bandgap reference circuit generating reference voltages that are temperature and supply voltage stable, the bandgap reference circuit and the voltage-controlled oscillator formed on a single integrated circuit.

16. The transmitter of claim 1, further including a shutdown mode circuit coupled to the voltage-controlled oscillator, the shutdown mode circuit and the voltage-controlled oscillator being formed on a single integrated circuit.

17. The transmitter of claim 1, further including a data encoder coupled between a data input pad and the voltage-controlled oscillator, the data encoder and the voltage-controlled oscillator being formed on a single integrated circuit.

*18. A transmitter having an automatic antenna tuning circuit, the transmitter comprising:*

*a transmit amplifier for being driven at a carrier frequency, the transmit amplifier for being connected to an antenna;*

*a variable capacitance, the variable capacitance and antenna forming at least part of a tuned circuit having a resonant frequency, wherein varying the variable capacitance tunes the resonance frequency of the tuned circuit; and*

*a tuning circuit connected to control the variable capacitance in response to a feedback control signal, the feedback control signal indicating whether the resonance frequency of the tuned circuit is matched to the carrier frequency, the tuning circuit for varying the variable capacitance based on the feedback control signal to cause the resonance frequency of the tuned circuit to match the carrier frequency,*

*at least the amplifier, variable capacitance, and tuning circuit being formed on a single integrated circuit.*

*19. The transmitter of claim 18 wherein the amplifier contains an oscillator for generating the carrier frequency.*

*20. The transmitter of claim 18 further comprising an oscillator providing a drive signal to the amplifier at the carrier frequency.*

*21. The transmitter of claim 18 further comprising:*

*an oscillator providing a drive signal to the amplifier at the carrier frequency;*

*a phase difference circuit receiving a first signal corresponding to a phase of a signal generated by the amplifier and receiving a second signal corresponding to a phase of a signal generated by the oscillator, the phase difference circuit generating the feedback control signal, the feedback control signal being related to a difference in phase between the first signal and the second signal.*

*22. The transmitter of claim 21 wherein the phase difference circuit is a phase detector.*

*23. The transmitter of claim 18 wherein the second signal is a quadrature signal 90 degrees out of phase with the drive signal.*

*24. The transmitter of claim 18 wherein the second signal is 90 degrees out of phase with the drive signal.*

*25. The transmitter of claim 18 wherein the variable capacitance comprises an array of capacitors that are selectively connected, by the tuning circuit, to the tuned circuit to adjust the resonance frequency of the tuned circuit.*

*26. The transmitter of claim 18 wherein the variable capacitance comprises MOS capacitors.*

*27. The transmitter of claim 18 wherein the variable capacitance comprises varactors.*

*28. The transmitter of claim 18 wherein the tuning circuit comprises a logic circuit whose digital output signal controls the variable capacitance, the feedback control signal causing the logic circuit to change the digital output signal to adjust the resonance frequency of the tuned circuit.*

*29. The transmitter of claim 28 wherein the logic circuit is a counter.*

*30. The transmitter of claim 29 wherein the counter also receives a clock signal for clocking transitions of the counter.*

*31. The transmitter of claim 18 wherein the variable capacitance is in parallel with the antenna.*

*32. The transmitter of claim 18 wherein the antenna is a loop antenna.*

*33. The transmitter of claim 18 wherein the tuning circuit varies the variable capacitance based on the feedback control signal to cause the resonance frequency of the tuned circuit to precisely match the carrier frequency.*

*34. The transmitter of claim 18 wherein the variable capacitance comprises an array of capacitors that are selectively connected, by the tuning circuit, to the tuned circuit to*

*adjust the resonance frequency of the tuned circuit, each capacitor in the array having a different size, wherein sizes of the capacitors are exponentially related.*

*35. The transmitter of claim 18 wherein the amplifier is a differential amplifier.*

*36. The transmitter of claim 18 further comprising the antenna.*

*37. A method for performing automatic tuning in a transmitter comprising:*

*driving a transmit amplifier at a carrier frequency, the amplifier being connected to an antenna;*

*varying a variable capacitance, the variable capacitance and antenna forming at least part of a tuned circuit having a resonant frequency, wherein varying the variable capacitance tunes the resonance frequency of the tuned circuit;*

*applying a feedback control signal to a tuning circuit connected to control the variable capacitance, the feedback control signal indicating whether the resonance frequency of the tuned circuit is matched to the carrier frequency; and*

*varying the variable capacitance by the tuning circuit based on the feedback control signal to cause the resonance frequency of the tuned circuit to match the carrier frequency,*

*at least the amplifier, variable capacitance, and tuning circuit being formed on a same integrated circuit.*

*38. The method of claim 37 further comprising:*

*providing a drive signal to the amplifier by an oscillator at the carrier frequency;*

*receiving by a phase difference circuit a first signal corresponding to a phase of a signal generated by the amplifier and receiving by the phase difference circuit a second signal corresponding to a phase of a signal generated by the oscillator; and*

*generating by the phase difference circuit the feedback control signal, the feedback control signal being related to a difference in phase between the first signal and the second signal.*

*39. The method of claim 38 wherein the phase difference circuit is a phase detector.*

*40. The method of claim 38 wherein the second signal is 90 degrees out of phase with the drive signal.*

*41. The method of claim 37 wherein varying the variable capacitance comprises selectively connecting an array of capacitors to the tuned circuit to adjust the resonance frequency of the tuned circuit.*

*42. The method of claim 37 wherein the variable capacitance comprises one or more varactors, and wherein varying the variable capacitance comprises applying a signal to the one or more varactors to adjust the resonance frequency of the tuned circuit.*

*43. The method of claim 37 wherein the tuning circuit comprises a logic circuit generating a digital output signal, and wherein varying the variable capacitance comprises selectively controlling the coupling of capacitors to the tuned circuit based on the digital output signal, the feedback control signal causing the logic circuit to change the digital output signal to adjust the resonance frequency of the tuned circuit.*

*44. The method of claim 37 wherein the variable capacitance is in parallel with the antenna.*

*45. The method of claim 37 wherein the antenna is a loop antenna.*

*46. The method of claim 37 wherein varying the variable capacitance based on the feedback control signal comprises varying the variable capacitance to cause the resonance frequency of the tuned circuit to precisely match the carrier frequency.*

*47. A transmitter comprising:*

*a voltage-controlled oscillator having an operating frequency;*

*an antenna, the antenna forming part of a tuned circuit coupled to the voltage-controlled oscillator,*

*a variable capacitance forming part of the tuned circuit; and*

*a tuning circuit connected to control the variable capacitance in response to a feedback control signal, the feedback control signal indicating whether the resonance frequency of the tuned circuit is matched to the carrier frequency, the tuning circuit varying the variable capacitance based on the feedback control signal to cause the resonance frequency of the tuned circuit to match the carrier frequency,*

*at least the oscillator, variable capacitance, and tuning circuit being formed on a same integrated circuit.*

*48. The transmitter of claim 47 wherein the variable capacitance comprises an array of capacitors that are selectively connected, by the tuning circuit, to the tuned circuit to adjust the resonance frequency of the tuned circuit.*

*49. The transmitter of claim 47 wherein the variable capacitance comprises varactors.*

*50. The transmitter of claim 47 wherein the tuning circuit comprises a logic circuit whose digital output signal controls the variable capacitance, the feedback control signal causing the logic circuit to change the digital output signal to adjust the resonance frequency of the tuned circuit.*

*51. The transmitter of claim 47 further comprising a phase difference circuit receiving a first signal corresponding to a phase of a signal generated by the amplifier and receiving a second signal corresponding to a phase of a signal generated by the oscillator, the phase difference circuit generating the feedback control signal, the feedback control signal being related to a difference in phase between the first signal and the second signal.*

*52. The transmitter of claim 47 further comprising a reference generator, external to the integrated circuit, providing a reference frequency for controlling a frequency of the voltage oscillator.*

* * * * *

UNITED STATES PATENT AND TRADEMARK OFFICE

CERTIFICATE OF CORRECTION

PATENT NO. : RE 40,620 E
APPLICATION NO. : 11/134468
DATED : January 6, 2009
INVENTOR(S) : Joseph S. Elder, Mohammed D. Islam and Joseph T. Yestrebsky It is certified that error appears in the above-identified patent and that said Letters Patent is hereby corrected as shown below:

Column 13, line 41, Claim 13: Cancel "voltage-contrlled" and substitute --voltage-controlled--.

Signed and Sealed this

Twenty-sixth Day of May, 2009

JOHN DOLL
*Acting Director of the United States Patent and Trademark Office*